(12) United States Patent
Peng et al.

(10) Patent No.: US 12,687,557 B2
(45) Date of Patent: Jul. 21, 2026

(54) SAMPLE ANALYZER AND LIQUID ASPIRATION CONTROL METHOD THEREOF

(71) Applicant: Shenzhen Mindray Bio-Medical Electronics Co., Ltd., Shenzhen (CN)

(72) Inventors: Kejun Peng, Shenzhen (CN); Run Du, Shenzhen (CN); Qiushi Yi, Shenzhen (CN); Wentao Ju, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 428 days.

(21) Appl. No.: 17/958,015

(22) Filed: Sep. 30, 2022

(65) Prior Publication Data

US 2023/0100040 A1 Mar. 30, 2023

(30) Foreign Application Priority Data

Sep. 30, 2021 (CN) .......................... 202111166614.3
Oct. 29, 2021 (CN) .......................... 202111277099.6

(51) Int. Cl.
*G01N 35/10* (2006.01)
*G01N 35/00* (2006.01)

(52) U.S. Cl.
CPC ... *G01N 35/1009* (2013.01); *G01N 35/00722* (2013.01)

(58) Field of Classification Search
CPC ....... G01N 35/1011; G01N 2035/1013; G01N 35/1009; G01N 35/00584;
(Continued)

(56) References Cited

U.S. PATENT DOCUMENTS 6,107,810 A * 8/2000 Ishizawa ............ G01N 35/1009
422/511
8,863,593 B2 * 10/2014 Weng ................. G01N 35/1011
73/863.02
(Continued)

FOREIGN PATENT DOCUMENTS

CN 101839744 A 9/2010
CN 101881706 B * 4/2014 ......... G01F 25/0092
(Continued)

OTHER PUBLICATIONS

Translate (JP 2019215264 A) (Year: 2019).*
Translate (JP2013148360A) (Year: 2013).*

*Primary Examiner* — Fatemeh Esfandiari Nia
(74) *Attorney, Agent, or Firm* — Syncoda LLC; Feng Ma

(57) ABSTRACT

The embodiments of the disclosure provide a sample analyzer and a liquid aspiration control method for a sample analyzer. When a liquid aspiration assembly is moving down toward a container, a signal acquisition and analysis assembly acquires and analyzes a first electrical signal; when the first electrical signal meets a first preset condition, the signal acquisition and analysis assembly acquires and analyzes a second electrical signal that is an electrical signal subsequent to the first electrical signal, and determines, according to at least the second electrical signal, whether the second electrical signal meets a second preset condition different from the first preset condition; and when the second electrical signal meets the second preset condition, the signal acquisition and analysis assembly sends information indicating that the liquid aspiration assembly reaches a surface of the liquid. The accuracy of liquid surface detection of the liquid in the container is improved by sending the information indicating that the liquid aspiration assembly reaches a surface of the liquid only when the electrical signal acquired (Continued)

Time axis

111

T0: Start to detect a liquid level

T1': Contact the liquid level
T2': Detect a signal meeting a threshold
Determine that a second electrical signal
does not meet a second preset condition
T1: Contact the liquid level
T2: Detect the threshold
T3: Report the liquid level, and
slow down a needle T4: Stop the needle T5: Begin to aspirate a liquid T6: Complete liquid aspiration T7: Lift the needle by the signal acquisition and analysis assembly meets the first preset condition and the second preset condition.

23 Claims, 12 Drawing Sheets

(58) Field of Classification Search
CPC ....... G01N 35/00722; G01N 2035/009; G01N 2035/102; G01F 23/0007
See application file for complete search history.

(56) References Cited

U.S. PATENT DOCUMENTS

| | | | | |
|---|---|---|---|---|
| 2012/0000296 A1* | 1/2012 | Weng | .................. | G01N 35/1011 |
| | | | | 73/863.02 |
| 2015/0211915 A1* | 7/2015 | Scarlett | .................. | G01F 23/266 |
| | | | | 73/304 C |
| 2015/0268230 A1* | 9/2015 | Endo | ..................... | G01F 23/265 |
| | | | | 73/290 R |
| 2021/0181224 A1* | 6/2021 | Onoki | ................ | G01N 35/1002 |

FOREIGN PATENT DOCUMENTS

| | | | | | | |
|---|---|---|---|---|---|---|
| CN | 111426853 A | * | 7/2020 | ........... | G01F 23/804 |
| DE | 69434638 T2 | * | 12/2006 | .......... | B01F 11/0022 |
| EP | 3086127 A1 | * | 10/2016 | .......... | G01N 35/021 |
| JP | H11271319 A | * | 10/1998 | | |
| JP | 2011013005 A | | 1/2011 | | |
| JP | 2013148360 A | | 8/2013 | | |
| JP | 2015184126 A | * | 10/2015 | ........... | G01F 23/265 |
| JP | 2019215264 A | | 12/2019 | | |

* cited by examiner

111

T1

T2

T3

111

111

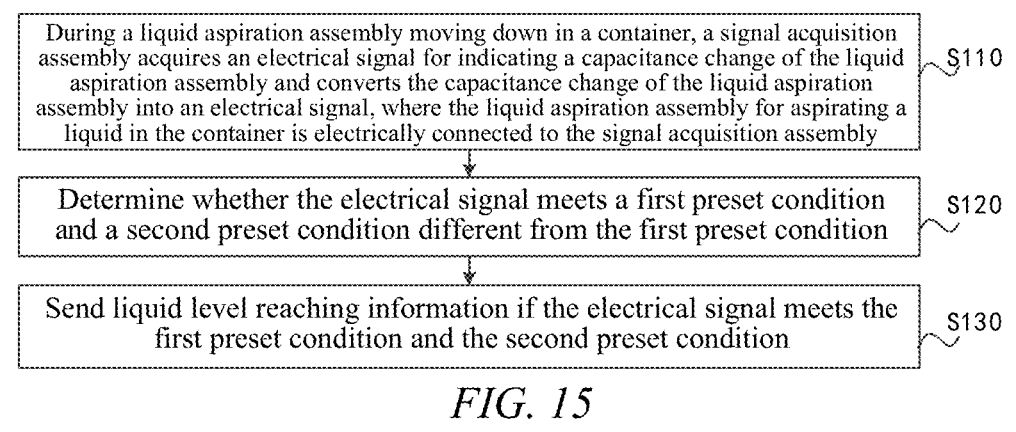

During a liquid aspiration assembly moving down in a container, a signal acquisition assembly acquires an electrical signal for indicating a capacitance change of the liquid aspiration assembly and converts the capacitance change of the liquid aspiration assembly into an electrical signal, where the liquid aspiration assembly for aspirating a liquid in the container is electrically connected to the signal acquisition assembly ⟩～S110

Determine whether the electrical signal meets a first preset condition and a second preset condition different from the first preset condition ⟩～S120

Send liquid level reaching information if the electrical signal meets the first preset condition and the second preset condition ⟩～S130

*FIG. 15*

SAMPLE ANALYZER AND LIQUID ASPIRATION CONTROL METHOD THEREOF

CROSS-REFERENCE TO RELATED APPLICATIONS

The present application claims the benefit of priority to Chinese Patent Application No. 202111166614.3, filed Sep. 30, 2021, and Chinese Patent Application No. 202111277099.6, filed Oct. 29, 2021, both of which are incorporated herein by reference in their entireties.

TECHNICAL FIELD

The disclosure relates to the technical field of sample analyzers, and in particular to a sample analyzer and a liquid aspiration control method for a sample analyzer.

BACKGROUND

Currently, a capacitive detection method is a mainstream liquid surface detection method in the industry, and can be applied to a sample analyzer. A liquid aspiration needle is equivalent to a positive plate of a capacitor, and a housing and the surrounding ground are equivalent to a negative plate of the capacitor. When the liquid aspiration needle is in contact with a liquid surface, a needle wall of the liquid aspiration needle being in contact with the liquid surface is equivalent to the positive plate of the capacitor being enlarged, and at this time, a capacitance change will cause an electrical signal change. This electrical signal change is acquired and identified, so as to detect the capacitance change, that is, detect whether the liquid aspiration needle reaches the liquid surface.

However, before the liquid aspiration needle is in contact with the liquid surface, a container, a liquid to be detected, air, a sample rack, and some interferents all act as the dielectric of the capacitor. When a relative position of the liquid aspiration needle changes or different interference scenarios are involved, the dielectric of the capacitor changes, which will cause the capacitance change and the electrical signal change. The current liquid surface detection method is susceptible to interference and has a high false detection rate. How to improve the reliability of liquid surface detection is a common concern in the industry.

SUMMARY

The disclosure provides a sample analyzer and a liquid aspiration control method for a sample analyzer, aiming to solve the current technical problem that a sample analyzer is susceptible to interference during liquid surface detection, causing a high false detection rate, etc.

In a first aspect, an embodiment of the disclosure provides a sample analyzer, including:

a liquid aspiration assembly for aspirating a liquid in a container;

a driving assembly for driving the liquid aspiration assembly to move; and a signal acquisition and analysis assembly for converting a capacitance change of the liquid aspiration assembly into an electrical signal; wherein while the liquid aspiration assembly is driven by the driving assembly to move down toward the container, after an abrupt change occurs in the electrical signal, the signal acquisition and analysis assembly acquires and analyzes a first electrical signal, and determines whether the first electrical signal meets a first preset condition; when the first electrical signal meets the first preset condition, the signal acquisition and analysis assembly acquires and analyzes a second electrical signal that is an electrical signal subsequent to the first electrical signal, and determines, according to at least the second electrical signal, whether the second electrical signal meets a second preset condition different from the first preset condition; and when the second electrical signal meets the second preset condition, the signal acquisition and analysis assembly sends information indicating that the liquid aspiration assembly reaches a surface of the liquid.

In a second aspect, an embodiment of the disclosure provides a sample analyzer, including:

a liquid aspiration assembly for aspirating a liquid in a container;

a driving assembly for driving the liquid aspiration assembly to move; and a signal acquisition and analysis assembly for converting a capacitance change of the liquid aspiration assembly into an electrical signal; wherein while the liquid aspiration assembly is driven by the driving assembly to move down toward the container, the signal acquisition and analysis assembly acquires an electrical signal before a preset time point, and determines whether the electrical signal before the preset time point meets a first preset condition and a second preset condition different from the first preset condition; the signal acquisition and analysis assembly sends a information indicating that the liquid aspiration assembly reaches a surface of the liquid, if the electrical signal before the preset time point meets the first preset condition and the second preset condition; and the preset time point is no later than the latest time point of reporting the information indicating that the liquid aspiration assembly reaches a surface of the liquid.

In a third aspect, an embodiment of the disclosure provides a liquid aspiration control method for a sample analyzer, including:

while a liquid aspiration assembly moving down in a container, a signal acquisition assembly acquiring an electrical signal for indicating a capacitance change of the liquid aspiration assembly and converting the capacitance change of the liquid aspiration assembly into an electrical signal, where the liquid aspiration assembly for aspirating a liquid in the container is electrically connected to the signal acquisition assembly;

determining whether the electrical signal meets a first preset condition and a second preset condition different from the first preset condition; and sending information indicating that the liquid aspiration assembly reaches a surface of the liquid if the electrical signal meets the first preset condition and the second preset condition.

The embodiments of the disclosure provide a sample analyzer and a liquid aspiration control method for a sample analyzer. When the liquid aspiration assembly moves down in the container, an electrical signal for indicating the capacitance change of the liquid aspiration assembly is acquired; it is determined whether the electrical signal meets the first preset condition and the second preset condition different from the first preset condition; and the liquid surface reaching information (ie. information indicating that the liquid aspiration assembly reaches a surface of the liquid) is sent when the electrical signal meets the first preset condition and the second preset condition. The accuracy of liquid surface detection of the liquid in the container is improved by sending the liquid surface reaching information only when the electrical signal acquired by the signal acquisition and analysis assembly meets the first preset condition and the second preset condition.

It should be understood that the above general description and the following detailed description are only exemplary and explanatory, and cannot limit the content disclosed in the embodiments of the disclosure.

BRIEF DESCRIPTION OF THE DRAWINGS

In order to more clearly describe the technical solutions in the embodiments of the disclosure, the drawings required for describing the embodiments will be briefly described below. The drawings in the following description show some of the embodiments of the disclosure, and those of ordinary skill in the art may still derive other drawings from these drawings without creative efforts.

FIG. 15 is a schematic flowchart of a liquid aspiration control method for a sample analyzer according to an embodiment of the disclosure.

LIST OF REFERENCE NUMERALS

Figure 1:
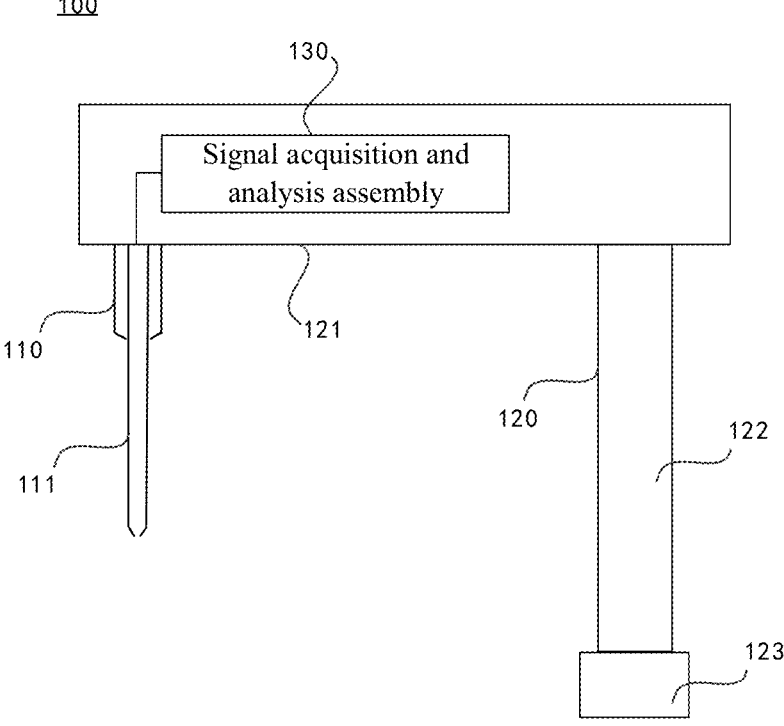
FIG. 1 is a schematic structural diagram of a sample analyzer according to an embodiment of the disclosure.

100. Sample analyzer; 110. Liquid aspiration assembly; 111. Liquid aspiration needle; 112. Liquid path; 113. Liquid path device; 120. Driving assembly; 121. Rocker arm; 122. Rocker; 123. Electric motor; 130. Signal acquisition and analysis assembly; 140. Control module; 15. Pressure sensor; 152. Pressure measurement assembly.

DETAILED DESCRIPTION

The technical solutions of the embodiments of the disclosure will be described below clearly and comprehensively in conjunction with accompanying drawings of the embodiments of the disclosure. Apparently, the embodiments described are some of, rather than all of, the embodiments of the disclosure. All other embodiments obtained by persons of ordinary skill in the art based on the embodiments of the disclosure without creative efforts shall fall within the scope of protection of the disclosure.

The flowcharts shown in the drawings are only illustrated by way of example, and do not necessarily include all contents and operations/steps, nor do they have to be executed in the described order. For example, some operations/steps may also be decomposed, combined or partially combined, so the actual execution order may be changed according to actual conditions.

Some embodiments of the disclosure will be further described in detail below with reference to the drawings. In the case of no conflict, the embodiments and the features thereof described below can be combined with each other.

In order to improve a response speed of liquid surface detection, in the current liquid surface detection technologies in the industry, the commonly used technology is to report liquid surface reaching information (i.e. once it is detected that a signal converted from a capacitance characteristic meets a threshold, namely, immediate detection and reporting. Specifically, when a capacitance change of a liquid aspiration needle causes a change in electrical signal, it is immediately determined that the liquid aspiration needle is in contact with a liquid surface, and liquid surface reaching information is sent. Although the sensitivity of liquid surface detection is improved, in some scenarios, it is possible that the liquid aspiration needle is not in contact with the true liquid surface, the change in electrical signal acts as abnormal interference in corresponding scenarios, and these scenarios include but are not limited to one or more of the following: there is static electricity on a container, a liquid aspiration needle is in contact with a bubble, the liquid aspiration needle is in contact with a liquid droplet on an inner wall of the container, a liquid film is attached on the inner wall of the container, and a sample in the container is insufficient.

Referring to FIG. 1, FIG. 1 is a schematic structural diagram of a sample analyzer 100 according to an embodiment of the disclosure. By sending liquid surface reaching information (i.e. information indicating that the liquid aspiration assembly reaches a surface of the liquid) if an electrical signal acquired by a signal acquisition and analysis assembly 130 meets a first preset condition and a second preset condition different from the first preset condition, the accuracy of liquid surface detection of a liquid in a container is improved, it can be ensured that a liquid aspiration needle 111 is inserted into the liquid to an enough depth so as to prevent empty or less liquid aspiration, and meanwhile, the liquid aspiration needle 111 can be prevented from bumping against the bottom of the container.

In some embodiments, the sample analyzer 100 includes, but is not limited to, at least one of the following: a biochemical analyzer, an immune analyzer, a blood coagulation analyzer and a urine analyzer.

As shown in FIG. 1, the sample analyzer 100 includes a liquid aspiration assembly 110, a driving assembly 120, and a signal acquisition and analysis assembly 130. For example, the liquid aspiration assembly 110 includes a liquid aspiration needle 111. The liquid aspiration assembly 110 is configured to aspirate a liquid such as a sample or a reagent, and is also capable of discharging a liquid such as a sample or a reagent.

Figure 2:
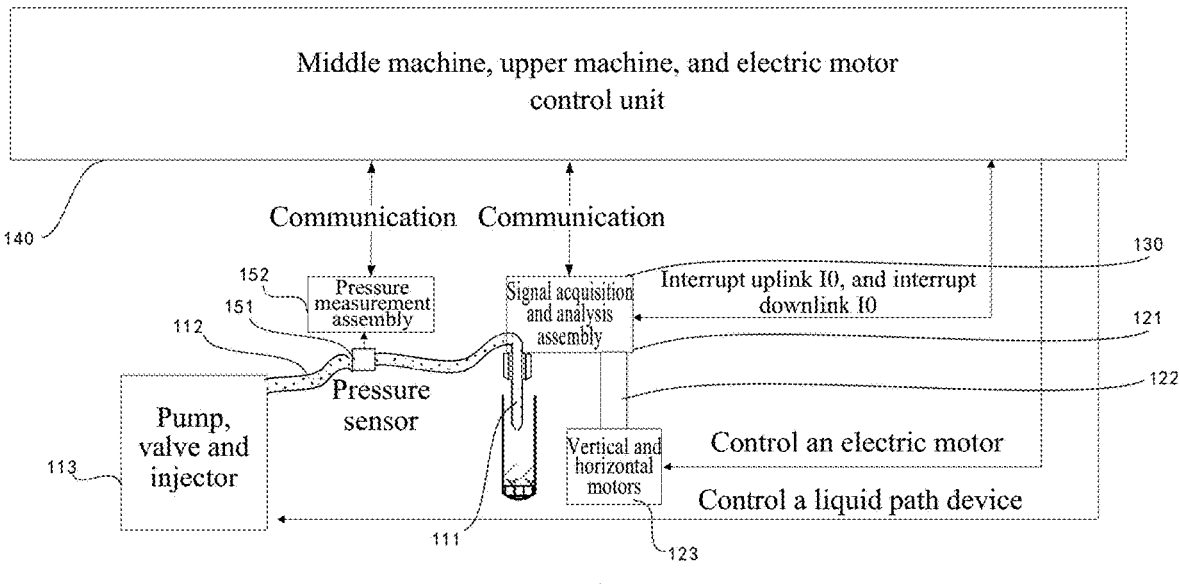
FIG. 2 is a schematic structural diagram of a sample analyzer in an embodiment.

In some embodiments, as shown in FIG. 2, the liquid aspiration assembly 110 further includes a liquid path 112 and a liquid path device 113, where the liquid path device 113 includes at least one of a pump, a valve, and an injector. For example, the pump, the valve and the injector are sequentially connected to the liquid aspiration needle 111, for example, the injector and the liquid aspiration needle 111 are connected by means of the liquid path 112, where the valve may be an electromagnetic valve. Illustratively, the electromagnetic valve is configured to control on/off between the pump and the injector. When the electromagnetic valve is closed, the pump cannot aspirate the liquid in the container by means of the injector, the liquid path 112 and the liquid aspiration needle 111; and when the electromagnetic valve is opened, the pump can aspirate the liquid in the container by means of the injector, the liquid path 112 and the liquid aspiration needle 111. Of course, the disclosure is also not limited thereto, for example, when the electromagnetic valve is closed, the liquid output by the pump, such as a reaction liquid like a hemolytic agent, cannot be injected into the liquid aspiration needle 111 by means of the injector and the liquid path 112, and when the electromagnetic valve is opened, the liquid output by the pump can be injected into the liquid aspiration needle 111 by means of the injector and the liquid path 112, so as to achieve rinsing of the liquid aspiration needle 111. For example, when the electromagnetic valve is closed, a cleaning fluid output by the pump cannot be injected into the liquid aspiration needle 111 by means of the injector and the liquid path 112, and when the electromagnetic valve is opened, the cleaning fluid output by the pump can be injected into the liquid aspiration needle 111 by means of the injector and the liquid path 112, so as to achieve rinsing of the liquid aspiration needle 111.

Illustratively, the driving assembly 120 is configured to drive the liquid aspiration needle 111 to move, for example, drive the liquid aspiration needle 111 to move down toward the container such that a tip of the liquid aspiration needle 111 is dipped into the liquid in the container, and the driving assembly may also drive the liquid aspiration needle 111 to move upwards such that the liquid aspiration needle 111 is removed from the container, which may be referred to as needle lifting.

In some embodiments, as shown in FIGS. 1 and 2, the driving assembly 120 includes a rocker arm 121, where the rocker arm 121 is fixed to a rocker 122, the rocker 122 is vertically movable and rotatable, and the rocker arm 121 is driven by the rocker 122 to vertically move and horizontally rotate. The liquid aspiration needle 111 is provided on the rocker arm 121, and can reach a target position under the drive of the rocker arm 121. Illustratively, the driving assembly 120 further includes an electric motor 123 for driving the rocker 122 to move, such as a stepping motor. Of course, the disclosure is also not limited thereto. Optionally, the liquid aspiration needle 111 is detachably or fixedly connected to the driving assembly 120.

Referring to FIG. 2, the liquid aspiration needle 111 is configured to probe a liquid surface and generate a varying capacitance value when it is in contact with the liquid surface. When the liquid aspiration needle 111 is in contact with the liquid surface, the equivalent capacitance value thereof will change.

What is output by the liquid aspiration needle 111 is capacitance. In some embodiments, by means of at least one of a phase locked loop method, a bridge method, a direct method, a frequency method, etc., the signal acquisition and analysis assembly 130 may convert the capacitance change of the liquid aspiration needle 111 into an electrical signal, such as a voltage signal and a frequency signal. Of course, the disclosure is also not limited thereto. Illustratively, the signal acquisition and analysis assembly 130 may convert the capacitance change of the liquid aspiration needle 111 into a voltage signal by means of direct conversion or indirect conversion, for example, convert the capacitance into a current signal and then convert the current signal into the voltage signal.

Optionally, the signal acquisition and analysis assembly 130 may be provided inside a cavity of the rocker arm 121 to facilitate circuit protection and to facilitate connection with the liquid aspiration needle 111. Unnecessary interference and distortion may be avoided by using a short connection line between the liquid aspiration needle 111 and the signal acquisition and analysis assembly 130. Of course, the disclosure is also not limited thereto, for example, the signal acquisition and analysis assembly 130 may include a signal acquisition assembly and a signal analysis assembly, where the signal acquisition assembly is electrically connected to the liquid aspiration needle 111 and is configured to convert a capacitance change of the liquid aspiration needle 111 into an electrical signal, and the signal analysis assembly is configured to analyze whether the electrical signal acquired by the signal acquisition assembly meets a first preset condition and a second preset condition different from the first preset condition, and to send the liquid surface reaching information when the electrical signal meets the first preset condition and the second preset condition.

In some embodiments, as shown in FIG. 2, the sample analyzer 100 further includes a control module 140, where the control module 140 is configured to control the movement of the driving assembly 120 to keep the liquid aspiration assembly 110 from moving down, based on at least the liquid surface reaching information sent by the signal acquisition and analysis assembly 130. The control module 140 may include one or more of a middle machine, an upper machine, and an electric motor 123 control unit. Of course, the disclosure is also not limited thereto, for example, the control module 140 may be integrally provided with the signal acquisition and analysis assembly 130.

Illustratively, the control module 140 includes one or more processors that operate separately or collectively to execute control steps of the sample analyzer 100. Illustratively, the signal acquisition and analysis assembly 130 further includes a memory, and the processor and the memory may be connected by means of a bus, such as an I2C (Inter-integrated Circuit) bus. The processor is configured to run a computer program stored in the memory and to implement the control steps of the sample analyzer 100 when executing the computer program.

Illustratively, the driving assembly 120 is configured to drive the liquid aspiration needle 111 in the liquid aspiration assembly 110 to move down, and the signal acquisition and analysis assembly 130 is configured to convert the capacitance change of the liquid aspiration needle 111 into the electrical signal, and to determine, according to the electrical signal, whether the liquid aspiration needle 111 is in contact with the liquid surface. Illustratively, when determining that the liquid aspiration needle 111 is in contact with the liquid surface, the signal acquisition and analysis assembly 130 sends the liquid surface reaching information to the control module 140, such that the control module 140 controls, according to the liquid surface reaching information, the driving assembly 120 to drive the liquid aspiration assembly 110 to slow down or stop moving down. For example, the control module controls, by means of the electric motor 123 control unit, a vertical motor 123 and/or a horizontal motor 123 in the driving assembly 120 to rotate so as to drive the liquid aspiration assembly 110 to slow down or stop moving down. Of course, the disclosure is also not limited thereto, for example, when the signal acquisition and analysis assembly 130 determines that the liquid aspiration needle 111 is in contact with the liquid surface, the driving assembly 120 is controlled to drive the liquid aspiration assembly 110 to be in contact with the liquid, or when the signal acquisition and analysis assembly 130 determines that the liquid aspiration needle 111 is in contact with the liquid surface, liquid surface reaching information is sent to the driving assembly 120, and the driving assembly 120 drives, according to the liquid surface reaching information, the liquid aspiration assembly 110 to slow down or stop moving down.

Specifically, with regard to the sample analyzer 100 in an embodiment of the disclosure, while the liquid aspiration assembly 110 is driven by the driving assembly 120 to move down toward the container, after an abrupt change occurs in the electrical signal, the signal acquisition and analysis assembly 130 acquires and analyzes a first electrical signal, and determines whether the first electrical signal meets the first preset condition; when the first electrical signal meets the first preset condition, the signal acquisition and analysis assembly 130 acquires and analyzes a second electrical signal that is an electrical signal subsequent to the first electrical signal, and determines whether the second electrical signal meets the second preset condition different from the first preset condition according to at least the second electrical signal; and when the second electrical signal meets the second preset condition, the signal acquisition and analysis assembly 130 sends the liquid surface reaching information.

Figure 3:
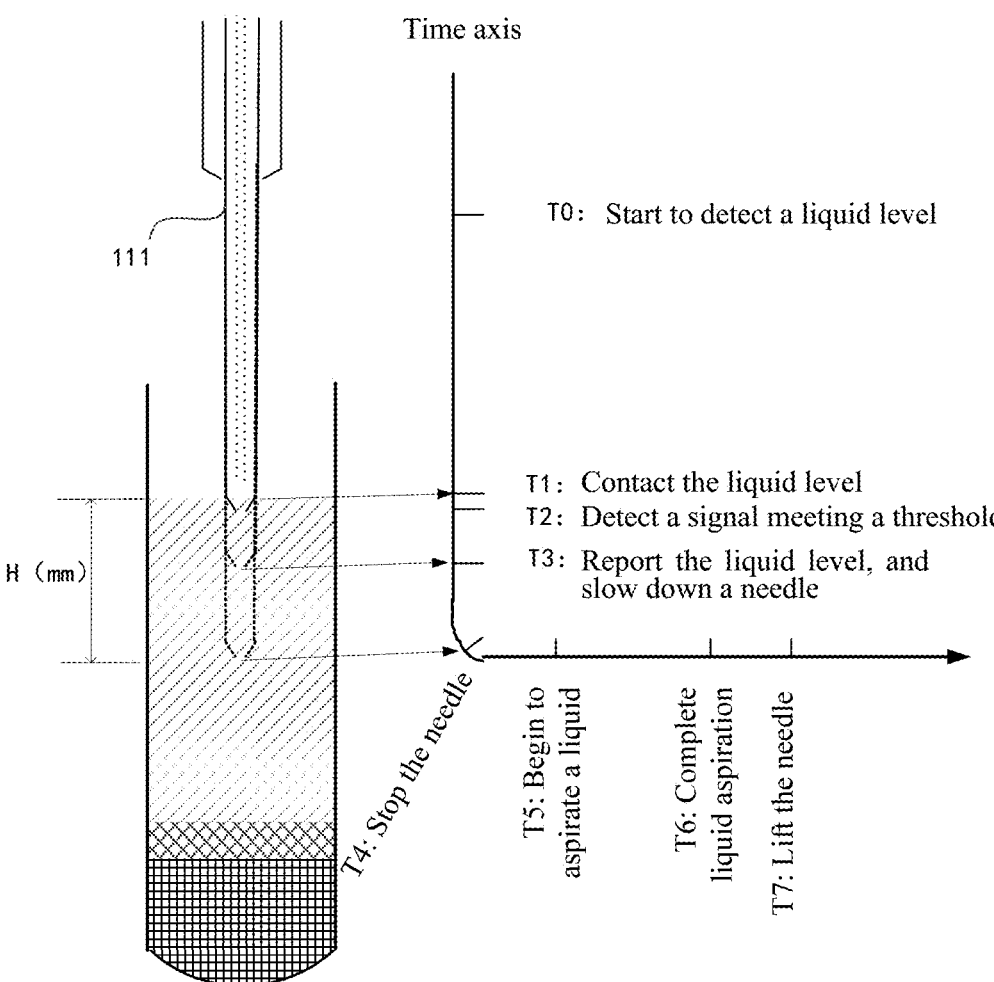
FIG. 3 is a schematic diagram of a time sequence of a liquid aspiration process in an embodiment.
Figure 4:
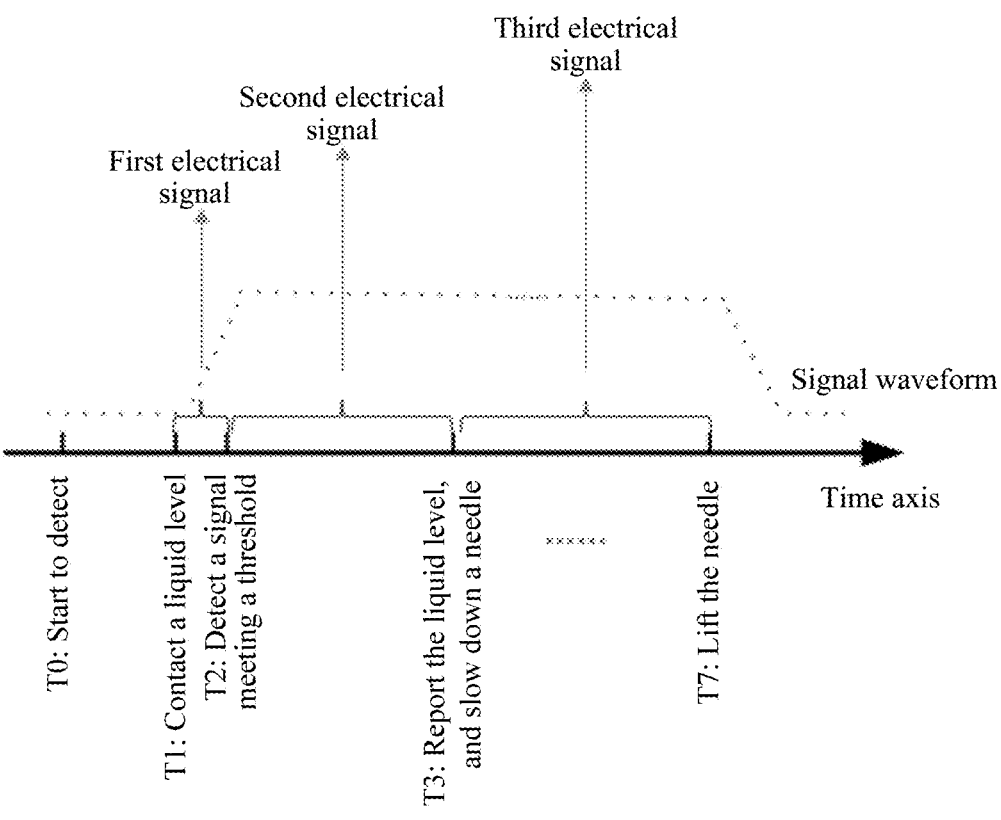
FIG. 4 is a schematic diagram of acquiring electrical signals in an embodiment.

In some embodiments, the downward movement distance of the liquid aspiration needle 111 can be determined according to the number of steps of the electric motor driving the liquid aspiration needle 111 to move down. Referring to FIG. 3, when the tip of the liquid aspiration needle 111 reaches a preset distance from an opening of the container at time point T0, liquid surface detection begins, and the signal acquisition and analysis assembly 130 begins to acquire and analyze the electrical signal and determines whether to send the liquid surface reaching information according to the electrical signal. Illustratively, referring to FIGS. 3 and 4, after an abrupt change occurs in the electrical signal, for example, after it is detected at time point T1 that the electrical signal begins to change, the signal acquisition and analysis assembly continues to acquire the electrical signal and determines whether the acquired electrical signal meets the first preset condition. With reference to FIG. 4, the electrical signal acquired during this period may be referred to as the first electrical signal; and it will be appreciated that the first electrical signal is a signal after the abrupt change occurs in the electrical signal, and the information acquisition and analysis assembly determines whether to send the liquid surface reaching information by analyzing the signal change in a time period.

Illustratively, when it is analyzed at time point T2 that the electrical signal meets the first preset condition, the electrical signal before time point T2 may be referred to as the first electrical signal, for example, the electrical signal from time point T1 to time point T2 is referred to as the first electrical signal. Preferably, after the electrical signal changes at time point T1, the signal is compared with the first preset condition, such as a threshold condition, and time point T1 may also be referred to as a time point of contact detection; and the time when the first signal meets the threshold condition is regarded as T2, which may also be referred to as a time point of threshold detection.

Illustratively, the signal acquisition and analysis assembly 130 is configured to determine that the first electrical signal meets the first preset condition if the first electrical signal meets a preset threshold; where the preset threshold is selected from: an amplitude change threshold, a slope threshold, and a first amplitude threshold. Optionally, the first preset condition may be referred to as the threshold condition. Optionally, it is determined that the first electrical signal meets the first preset condition when the first electrical signal meets at least one of the following conditions: the relative signal amplitude change of the first electrical signal within a preset duration is greater than or equal to a preset amplitude change threshold, a slope of the first electrical signal within the preset duration is greater than or equal to a preset slope threshold, and the absolute amplitude of the first electrical signal is greater than or equal to a preset first amplitude threshold.

Illustratively, referring to FIG. 3, when the tip of the liquid aspiration needle 111 is in contact with the liquid surface at time point T1, the capacitance change can be completed within a few tens of microseconds, and the specific value of this time is related to the type and volume of the liquid in the container. The conversion from the capacitance change to the electrical signal change can be completed within a few hundreds of microseconds or a few tens of milliseconds from time point T1 to time point T2, and this time period is related to the response time of a circuit in the signal acquisition and analysis assembly 130. Accordingly, as long as the circuit response time and the acquisition and analysis time are fast enough, it can be determined at most within a few tens of microseconds whether the voltage signal meets the first preset condition, for example, the completion of threshold detection. If the liquid surface reaching information is sent after it is determined that the liquid aspiration needle 111 is in contact with the liquid surface only within such a short time period as a few tens of microseconds to a few milliseconds when the liquid aspiration needle 111 is in contact with the liquid surface, due to limited judgment time, it is possible during this period that many interfering electrical signals generated by an abnormal scenario also have the same characteristics as a true liquid surface, such as a rising edge, it can be determined that the first preset condition is met, and if the liquid surface reaching information is sent at this time, the liquid surface reaching information will be falsely reported, resulting in abnormal liquid aspiration this time.

Referring to FIG. 4, in the embodiment of the disclosure, when it is analyzed that the first electrical signal meets the first preset condition, an electrical signal after the first electrical signal meeting the first preset condition is further acquired and analyzed, and may be referred to as the second electrical signal. Only when it is analyzed that the second electrical signal meets the second preset condition, it is determined that the liquid aspiration needle 111 is in contact with the liquid surface and the liquid surface reaching information is sent, while when the second electrical signal does not meet the second preset condition, the liquid surface reaching information is not sent.

When it is analyzed that the second electrical signal does not meet the second preset condition, it can be determined that the electrical signal change at least from time point T1 to time point T2 is the interfering electrical signal generated by the abnormal scenario, and the liquid aspiration needle 111 is actually not in contact with the liquid surface, and therefore the liquid surface reaching information is not sent.

Figure 5:
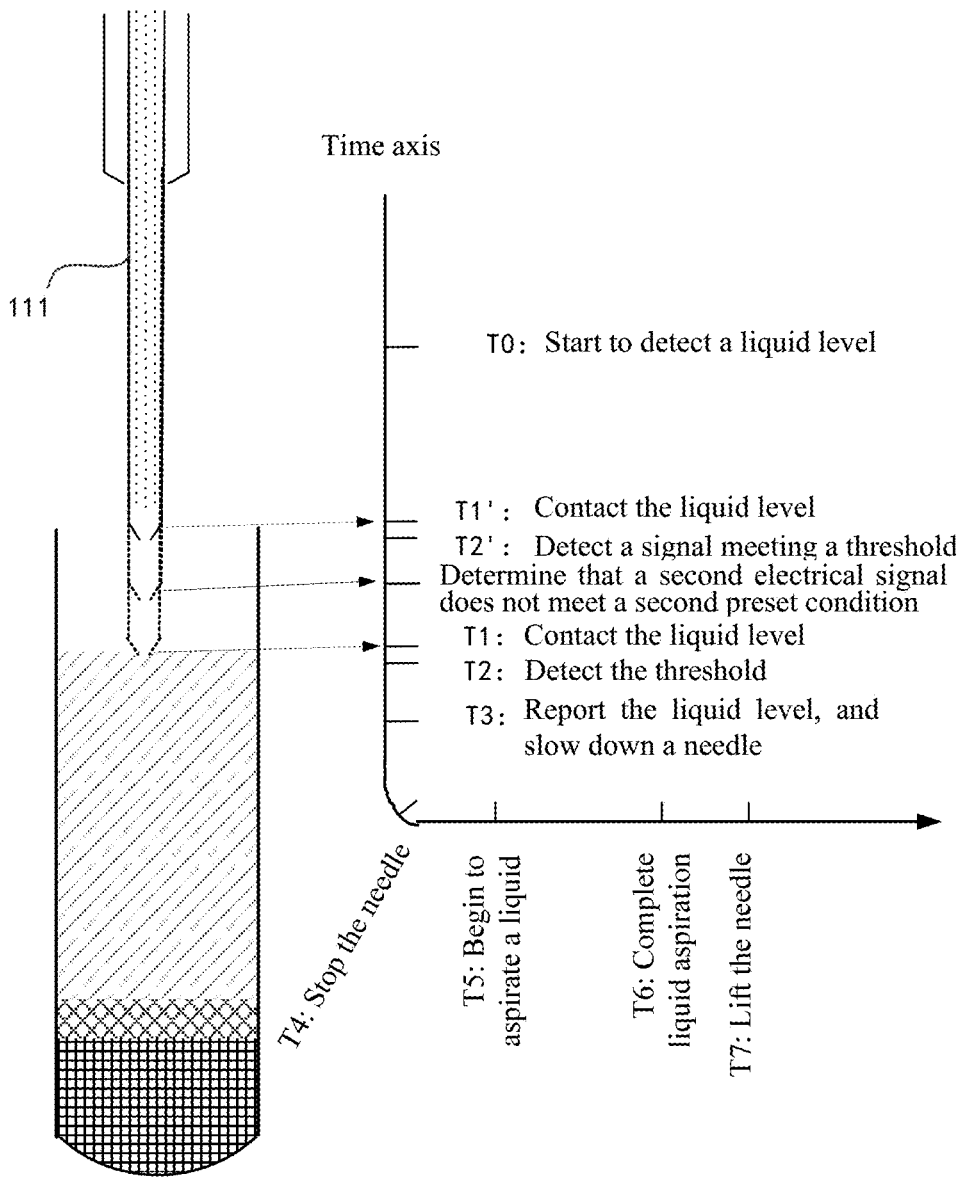
FIG. 5 is a schematic diagram of the time sequence of a liquid aspiration process in another embodiment.

In some embodiments, the signal acquisition and analysis assembly 130 is configured to acquire the first electrical signal again when the second electrical signal does not meet the second preset condition, and further determine whether the first electrical signal acquired again (i.e. re-acquiring a first electrical signal) meets the first preset condition. Referring to FIG. 5, when the first electrical signal from time point T1' to time point T2' meets the first preset condition, but the second electrical signal thereafter does not meet the second preset condition, it can be determined that the liquid aspiration needle 111 is not in contact with the true liquid surface. The first electrical signal can be acquired and analyzed again, and as shown in FIG. 5, when the liquid aspiration needle 111 is in contact with the true liquid surface at time point T1, the first electrical signal begins to change, and it can be analyzed at time point T2 that the first electrical signal meets the first preset condition.

Optionally, the signal acquisition and analysis assembly 130 is configured to send the liquid surface reaching information when the first electrical signal acquired again (i.e. re-acquiring a first electrical signal) meets the first preset condition. It will be appreciated that if multiple determinations on whether the second electrical signal meets the second preset condition are performed at different time points, the detection time is too long, and there is a risk of the liquid aspiration needle 111 continuously descending to be in contact with the bottom of the container; and in a preset number of times, if it is determined at a time that the second electrical signal does not meet the second preset condition, and later it is detected that the first electrical signal acquired again meets the first preset condition, the liquid surface reaching information can be sent, so that the liquid aspiration needle 111 can be prevented from descending too far to be in contact with the bottom of the container.

Optionally, the signal acquisition and analysis assembly 130 is configured to acquire the second electrical signal again (i.e. re-quiring the second electrical signal) when the first electrical signal acquired again meets the first preset condition, and to send the liquid surface reaching information when the second electrical signal acquired again meets the second preset condition. By determining again whether the second electrical signal meets the second preset condition, the accuracy of liquid surface detection can be improved, and misjudgment caused by multiple interference signals can be prevented.

In some embodiments, the signal acquisition and analysis assembly 130 is configured to send the liquid surface reaching information at a preset time point that is no later than the latest time point of reporting the liquid surface reaching information. For example, preset time point T3 is the acceptable latest time point of reporting the liquid surface reaching information, decomposed from the time sequence of a system, and this time point is strongly related to factors, such as the rotational speed of the electric motor 123, mechanical accuracy, the delay time of a circuit, and system speed measurement; and if a liquid surface reaching signal is sent after this time point, there will be a risk that the liquid aspiration needle 111 is in contact with the bottom of the container. The liquid surface reaching information is sent at time point T3 at the latest so that the liquid aspiration needle 111 can be prevented from being in contact with the bottom of the container.

Optionally, the signal acquisition and analysis assembly 130 is configured to send the liquid surface reaching information at a preset time point when the first electrical signal acquired again meets the first preset condition. Referring to FIG. 5, after it is analyzed at time point T2 that the first electrical signal meets the first preset condition, the liquid surface reaching signal is not sent first to prevent the situation that the liquid aspiration needle 111 is still not in contact with the true liquid surface at this time, but the liquid surface reaching information can be sent at preset time point T3, and at this time, there is a high probability that the liquid aspiration needle 111 is in contact with the true liquid surface. Optionally, the preset time point is no later than the latest time point of reporting the liquid surface reaching information, and by determining whether the second electrical signal at least from time point T2 to time point T3 meets the second preset condition, the information about the capacitance change of the liquid aspiration needle 111 indicated by the electrical signal can be fully used, and a true liquid surface can be accurately identified, so as to prevent a misjudgment generated when an abnormal scenario interferes with the scenario.

Illustratively, the duration of the second voltage signal is at least three times the duration of the first voltage signal. For example, the time period from time point T2 to time point T3 is usually a few milliseconds, which is much greater than a few hundred microseconds from time point T1 to time point T2, and the true liquid surface can be accurately identified by continuously analyzing whether electrical signal meets a corresponding preset condition.

In some embodiments, as shown in FIG. 3, a liquid aspiration process of the liquid aspiration needle 111 (e.g. a sample needle or a reagent needle) may be divided into several nodes T0-T7 based on a time axis. If it is not analyzed at time point T3 that the second electrical signal does not meet the second preset condition, the liquid surface reaching information can be sent to report the liquid surface so as to slow down or stop the liquid aspiration needle 111. For example, the control module 140 issues a series of mechanical commands after receiving the liquid surface reaching information sent by the signal acquisition and analysis assembly 130, so that the driving assembly 120 drives the liquid aspiration needle 111 to slow down, and the liquid aspiration needle 111 begins to slow down from time point T3, descends a falling height H millimeters (mm) up to time point T4 and then stops completely, and this time period may be more than five times of the time period from time point T2 to time point T3; and after stopping moving down at time point T4, the liquid aspiration needle 111 continues to aspirate the liquid at time point T5, the injector is turned off at time point T6 to complete liquid aspiration, and the driving assembly 120 drives the liquid aspiration needle 111 to move up at time point T7, namely, a series of actions such as needle lifting.

Illustratively, the signal acquisition and analysis assembly 130 is configured to determine whether the first electrical signal and the second electrical signal do not meet the second preset condition. By combining the first electrical signal and the second electrical signal, it can be accurately determined whether an abnormal interference signal is present.

In some embodiments, the signal acquisition and analysis assembly 130 is configured to determine that the second electrical signal does not meet the second preset condition if the signal characteristic of the second electrical signal is the same as at least one preset first abnormal signal characteristic, and to determine that the second electrical signal meets the second preset condition if the signal characteristic of the second electrical signal is different from the preset first abnormal signal characteristic. For example, there may be one or more preset first abnormal signal characteristics, including but not limited to at least one of the following characteristics of: electrostatic signal, bubble abnormality, liquid droplet abnormality, small liquid amount abnormality and liquid film abnormality. When the signal characteristic of the second electrical signal, or the signal characteristic of the first electrical signal, namely, the signal characteristic of the second electrical signal is not the same as all the first abnormal signal characteristics, it is determined that the second preset condition is met, and interference signals can be excluded in scenarios such as static electricity adhering to the container, bubbles on the liquid surface, a sampling needle being in contact with a liquid droplet on the wall of the container, insufficiency in the liquid in the container, and a liquid film adhering to the wall of the container.

Specifically, according to the sample analyzer 100 in another embodiment of the disclosure, while the liquid aspiration assembly 110 is driven by the driving assembly 120 to move down toward the container, the signal acquisition and analysis assembly 130 acquires an electrical signal before a preset time point, and determines whether the electrical signal before the preset time point meets a first preset condition and a second preset condition different from the first preset condition; the signal acquisition and analysis assembly sends a liquid surface reaching information, if the electrical signal before the preset time point meets the first preset condition and the second preset condition; and the preset time point is no later than the latest time point of reporting the liquid surface reaching information.

Illustratively, referring to FIG. 4, while the liquid aspiration assembly 110 is driven by the driving assembly 120 to move down toward the container, an electrical signal is acquired from time point T0 to time point T3, and it is determined whether the electrical signal meets the first preset condition and the second preset condition, for example, it is determined whether there is a signal meeting the first preset condition in the front portion of the electrical signal, and it is determined whether a signal in the back portion of the electrical signal meets the second preset condition. It will be appreciated that it is possible not to limit the division of the first electrical signal and the second electrical signal by determining whether the electrical signal reaches a preset threshold, and it is also possible not to limit the acquisition of the second electrical signal to be performed after the first electrical signal meets the first preset condition.

In some embodiments, the signal acquisition and analysis assembly 130 is configured to determine, when there is a change of regressing toward a signal baseline in the second electrical signal, that the signal characteristic of the second electrical signal is the same as the preset first abnormal signal characteristic, and/or that the second electrical signal does not meet the second preset condition.

Illustratively, when the second electrical signal regresses to a preset range in the vicinity of the signal baseline, it is determined that the signal characteristic of the second electrical signal is the same as the preset first abnormal signal characteristic, and/or that the second electrical signal does not meet the second preset condition.

Figures 6, 7:
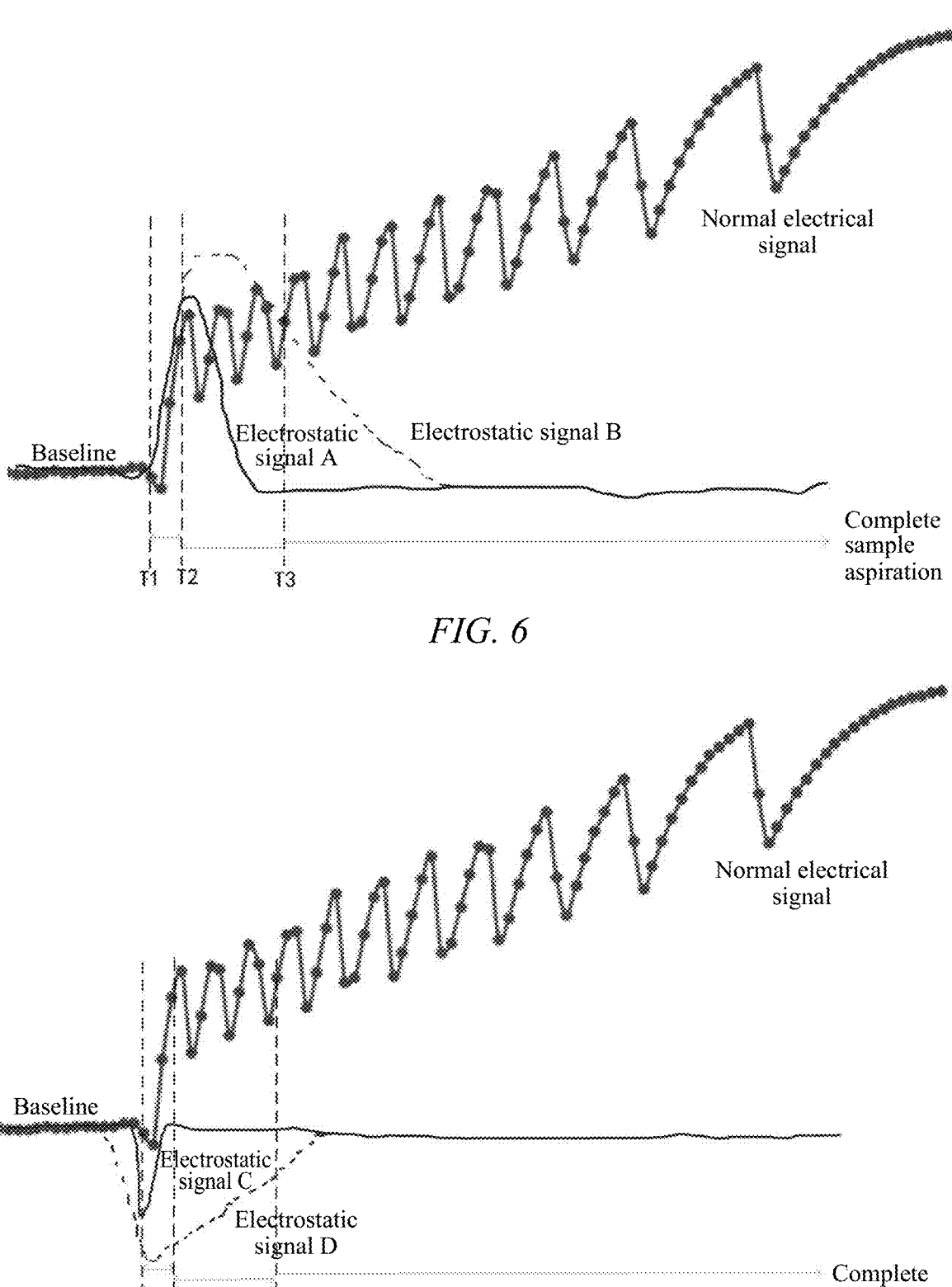
FIG. 6 is a schematic diagram of electrostatic signals in an embodiment.
FIG. 7 is a schematic diagram of electrostatic signals in another embodiment.

The commonly used materials of the container used for the sample analyzer 100, such as a sample tube or a micro measuring cup, are glass and a PET material. The molds used by container manufacturers are made of a metal material. During demolding, static electricity is generated by friction between the inner wall of the container and the metal mold. Although some sample analyzers 100 are provided with an electrostatic brush to remove residual electrostatic charges on the surface of the container, the residual electrostatic charges on the inner wall of the container are very difficult to thoroughly remove. When the liquid aspiration assembly 110 enters the container, the electrostatic charges on the wall of the container affect an alternating signal on the liquid aspiration needle 111, accordingly, the electrical signal suddenly changes, and it is easy to falsely detect that the liquid aspiration assembly 110 is in contact with the liquid surface, thus failing to ensure accurate and safe liquid aspiration. FIGS. 6 and 7 show the electrical signal from downward movement of the liquid aspiration needle 111 to the completion of sample aspiration when there is no electrostatic interference, which can be referred to as a normal electrical signal; the liquid aspiration needle 111 begins to be in contact with the liquid surface at time point T1; and since a phase-locking process of a phase-locked loop causes a step change in signal amplitude, a frequency-locking process causes oscillation and rise of the signal amplitude, and an oscillation amplitude and a period are related to loop filter parameters of the phase-locked loop. From time point T1 to time point T2, it can be detected that the first electrical signal of the normal electrical signal has a signal amplitude exceeding a certain threshold within a unit time, for example, showing a rising edge, and both the second electrical signal from time point T2 to time point T3 and the third electrical signal after time point T3 oscillate and rise in amplitude. Referring to FIG. 6, electrostatic signal A and electrostatic signal B are positive pulse signals generated on the liquid aspiration needle 111 by the static electricity on the container, and the positive pulse signals, like the normal electrical signal, have a rising edge first and then fall back, but a fall amplitude of the static electricity is greater than a fall amplitude of the normal signal, and can generally fall back to the vicinity of the signal baseline, namely, a preset range in the vicinity of the signal baseline. Therefore, when the second electrical signal regresses to the preset range in the vicinity of the signal baseline, it is determined that the second electrical signal does not meet the second preset condition, the liquid surface reaching signal is not sent, but the acquisition and analysis of subsequent electrical signals can still continue. Referring to FIG. 7, electrostatic signal C and electrostatic signal D are negative pulse signals generated on the liquid aspiration needle 111 by the static electricity on the container, and the negative pulse signals are similar to an overshoot signal (which may be referred to as a ringback) before the rising edge of the normal electrical signal; however, the height of the static electricity rising from a trough is much less than the height of the normal signal, and can only return to the vicinity of the baseline, namely, the preset range in the vicinity of the signal baseline. Therefore, when the second electrical signal regresses to the preset range in the vicinity of the signal baseline, it is determined that the second electrical signal does not meet the second preset condition, the liquid surface reaching signal is not sent, but the acquisition and analysis of subsequent electrical signals can still continue.

Figure 8:
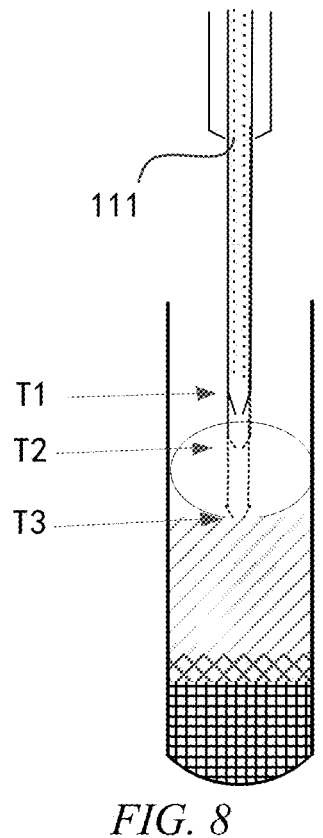
FIG. 8 is a schematic diagram of a liquid aspiration needle in contact with a bubble in an embodiment.

Referring to FIG. 8, a bubble sometimes adheres to the surface of the sample or reagent liquid in the container. When the liquid surface of the liquid in the container is detected by means of a capacitive detection method, the liquid aspiration needle 111 easily comes into contact with the bubble before coming into contact with the liquid surface, thus resulting in an abrupt change in electrical signal characteristic, it is easy to falsely detect that the liquid aspiration needle 111 is in contact with the liquid surface, and taking the bubble as the liquid surface may cause empty or less aspiration, thus leading to an erroneous clinical result.

Figures 9, 10:
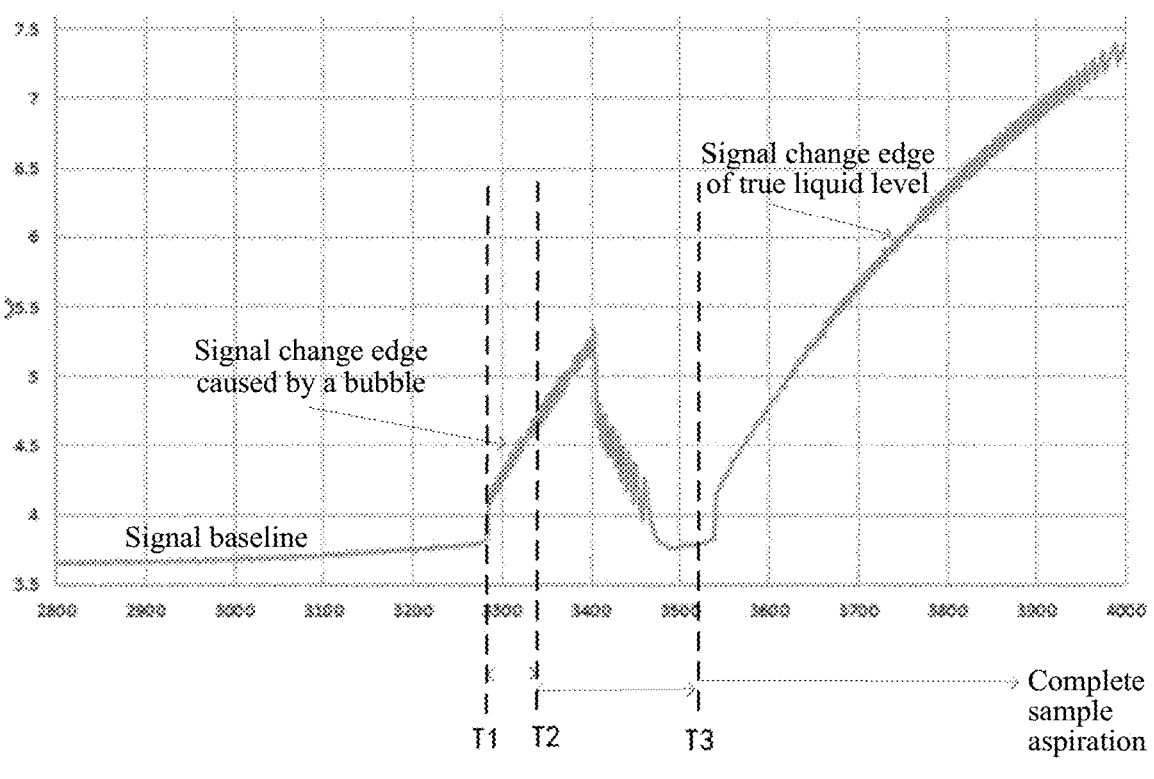
FIG. 9 is a schematic diagram of an electrical signal when a liquid aspiration needle is in contact with a bubble in an embodiment.
FIG. 10 is a schematic diagram of a liquid film attached to a wall of a container in an embodiment.

Referring to FIGS. 8 and 9, the liquid aspiration needle 111 being in contact with the bubble at time point T1 is equivalent to the positive plate of a capacitor being enlarged, and the capacitance change will cause an amplitude increase of the electrical signal; it is detected from time point T1 to time point T2 that the first electrical signal meets the first preset condition; however, after time point T2, the bubble breaks itself or is pierced by the liquid aspiration needle 111, so that the second electrical signal after time point T2 has a change of regressing to the signal baseline. As shown in FIG. 9, from time point T2 to time point T3, the second electrical signal regresses to the preset range in the vicinity of the signal baseline, and it can be determined that the signal characteristic of the second electrical signal is the same as the preset first abnormal signal characteristic, and/or that the second electrical signal does not meet the second preset condition.

For example, as shown in FIGS. 8 and 9, the liquid aspiration needle 111 is in contact with the actual liquid surface at time point T3, namely, the true liquid surface, and the change in electrical signal can be seen in FIG. 9.

Referring to FIG. 10, a liquid film is attached to the wall of the container, and when the liquid aspiration needle 111 enters the container, the liquid film on the inner wall of the container acts as a dielectric of the capacitor, and will cause a capacitance change, resulting in a change in electrical signal. In some embodiments, the signal acquisition and analysis assembly 130 is configured to determine that the second electrical signal does not meet the second preset condition if a slope of a change trend of the second electrical signal is less than or equal to a preset slope threshold, or less than or equal to a slope of a change trend of the first electrical signal, and may illustratively determine that the second electrical signal is an interference signal generated by the liquid film.

Figure 11:
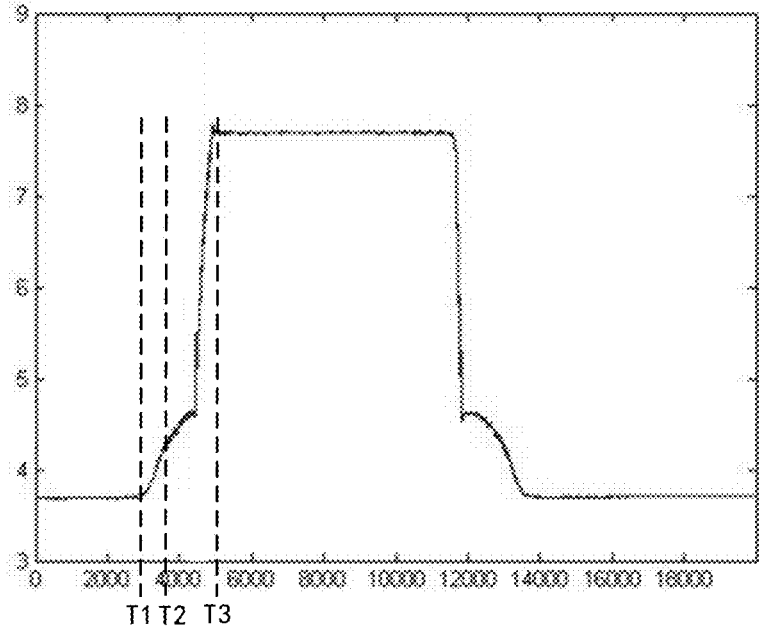
FIG. 11 is a schematic diagram of an electrical signal in a liquid film scenario in an embodiment.

As shown in FIG. 11, the tip of the liquid aspiration needle 111 enters the container at time point T1, the capacitance changes under the influence of the liquid film, the amplitude of the first electrical signal rises, it is analyzed at time point T2 that the first electrical signal meets the first preset condition, and the second electrical signal from time point T2 to time point T3 is acquired and analyzed. Referring to FIG. 11, the overall slope of the whole segment of second electrical signal is greater than a slope threshold, or is greater than the overall slope of the first electrical signal, namely, the slope of the second electrical signal increases significantly, corresponding to the transition from the interference signal of the liquid film to the contact between the liquid aspiration needle 111 and the actual liquid surface, and therefore, it can be determined that the second electrical signal meets the second preset condition, and the liquid surface reaching signal can be sent. However, when the overall slope of the whole segment of second electrical signal is less than or equal to the slope threshold, or is less than or equal to the overall slope of the first electrical signal, namely, the slope of the second electrical signal does not increase significantly, it can be determined that the second electrical signal is the interference signal of the liquid film, the liquid aspiration needle 111 is not in contact with the actual liquid surface, and the second electrical signal does not meet the second preset condition.

In some embodiments, the slopes of the electrical signal in each acquisition period and the electrical signal in a previous sampling period of the second electrical signal may also be analyzed to obtain the changes of the electrical signals of adjacent sampling periods as the slope of the electrical signal in each sampling period; and when the slope of the electrical signal in a sampling period of the second electrical signal is greater than a preset slope threshold or greater than the slope of the electrical signal in each sampling period of the first electrical signal, it can be determined that the slope of the second electrical signal increases significantly, and that the second electrical signal meets the second preset condition.

In some embodiments, the signal acquisition and analysis assembly is configured to determine that the second electrical signal meets the second preset condition, if the second electrical signal, or the first electrical signal and the second electrical signal, have a change rate between the slope of a signal change in a second time period and the slope of a signal change in a first time period that is greater than a preset threshold of change rate, where the second time period is later than the first time period. Referring to FIG. 11, the slope of the second electrical signal suddenly increases between time point T2 and time point T3, the slope of the second half is significantly greater than the slope of the first half, corresponding to the transition from the interference signal of the liquid film to the contact between the liquid aspiration needle 111 and the actual liquid surface, and therefore, it can be determined that the second electrical signal meets the second preset condition, and the liquid surface reaching signal can be sent.

In some embodiments, referring to FIG. 11, when it is detected from time point T1 to time point T2 that there is a first abrupt change in the amplitude of the first electrical signal, for example, beginning to rise from the signal baseline, it is determined that the first electrical signal meets the first preset condition; and from time point T2 to time point T3, it is detected that there is a second abrupt change in the amplitude of the second electrical signal, and it should be noted that when the second abrupt change occurs at time point T2, at a certain time point between time point T2 and time point T3, or at time point T3, it can be determined that the second electrical signal meets the second preset condition. The first abrupt change corresponds to the tip of the liquid aspiration needle 111 entering the container, and the liquid film on the inner wall of the container acts as the dielectric of the capacitor, causing the amplitude of the electrical signal to rise; and the second abrupt change corresponds to the electrical signal generated due to the contact between the liquid aspiration needle 111 and the liquid surface.

Illustratively, after the first abrupt change occurs in the electrical signal, the liquid surface reaching information is not sent first, but it is determined whether the second abrupt change occurs in the electrical signal after the acquisition and analysis continue; and when the second abrupt change is detected, it can be determined that the liquid aspiration needle 111 is in contact with the actual liquid surface, and the liquid surface reaching information can be sent. False reporting of the liquid surface caused by the interference of the liquid film can prevented, and the accuracy of liquid surface detection can be improved.

Illustratively, when the difference and/or ratio of the amplitude change of the electrical signal before and after the second abrupt change is large enough, the second abrupt change is clear enough to be consistent with the abrupt change between the interference signal of the liquid film and the electrical signal indicating that the liquid aspiration needle 111 is in contact with the actual liquid surface, and at this time, the liquid aspiration needle 111 has a high probability of contact with the actual liquid surface, and the liquid surface reaching information can be sent, thus improving the accuracy of liquid surface detection. In other words, when the difference and/or the ratio of the amplitude change of the electrical signal before and after an abrupt change is large enough, it can be determined that the abrupt change is the second abrupt change when the liquid aspiration needle is in contact with the liquid surface.

Illustratively, when the slope during rising of the electrical signal after the second abrupt change is large enough and/or the amplitude reached after the rise is large enough, it is consistent with the signal characteristic of the signal indicating that the actual liquid surface is contacted, and at this time, the liquid aspiration needle 111 has a high probability of contact with the actual liquid surface, the liquid surface reaching information can be sent, and the accuracy of liquid surface detection is thus improved.

Illustratively, the second electrical signal may be an electrical signal acquired after it is detected that the first electrical signal meets the first preset condition and before the liquid surface reaching information is sent. In some embodiments, the signal acquisition and analysis assembly 130 is further configured to acquire and analyze a third electrical signal after the liquid surface reaching information is sent. Referring to FIG. 4, the third electrical signal is acquired after the liquid surface reaching information is sent at time point T3. It will be appreciated that the third electrical signal may be the electrical signal acquired after the liquid surface reaching information is sent.

Figure 12:
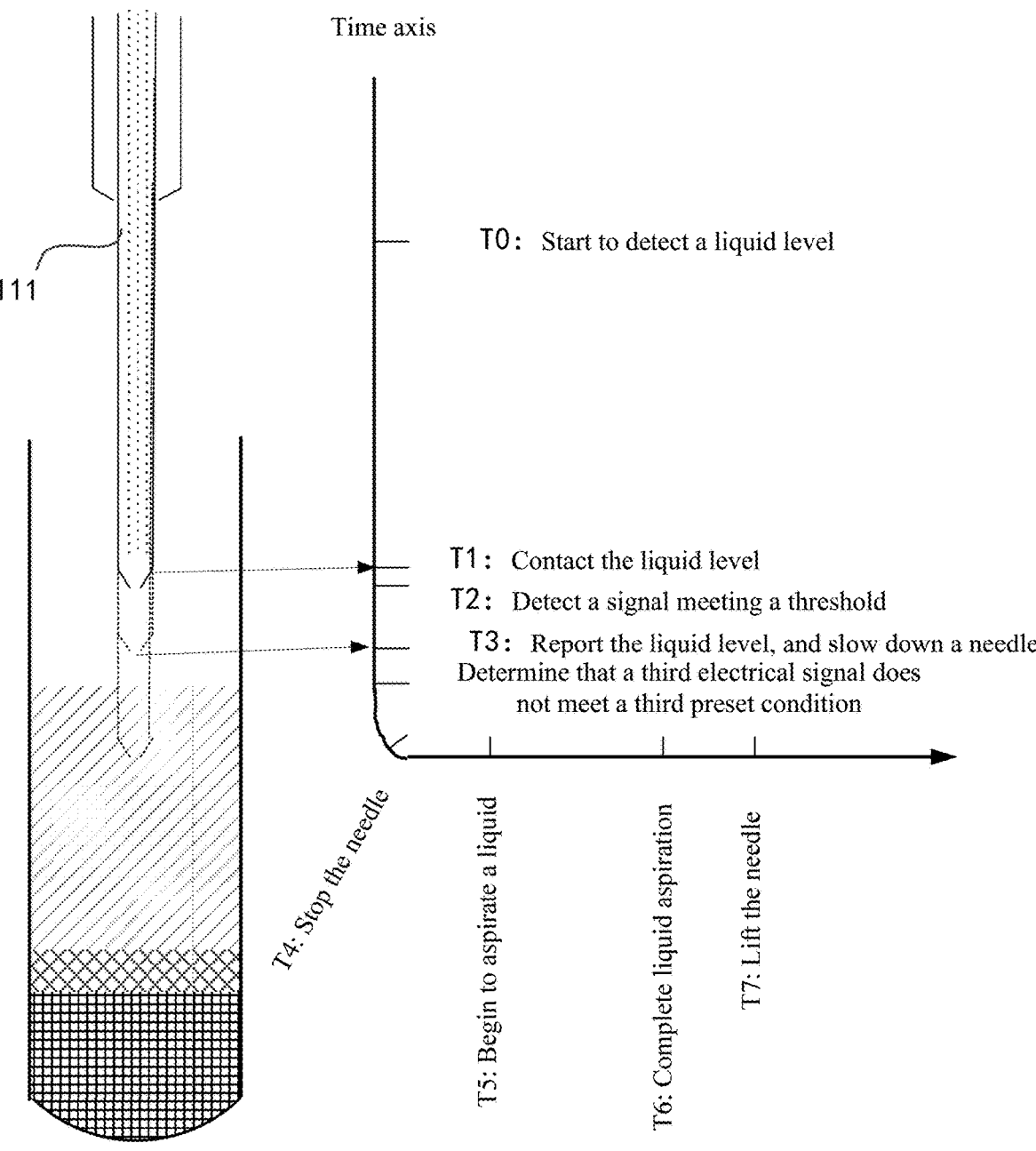
FIG. 12 is a schematic diagram of a time sequence of a liquid aspiration process in yet another embodiment.

In some detection scenarios, referring to FIG. 12, when the liquid surface reaching signal is sent, it is still possible that the liquid aspiration needle 111 is not yet in contact with the actual liquid surface. Some abnormal scenarios may generate interfering electrical signals remaining for a long duration, and the generated signals remain at a high level for a long duration, for example, the signal characteristics of the abnormal scenarios, such as a wide pulse generated by static electricity, bubble breakage, aspiration failure due to sample insufficiency in a solution, and the contact between the liquid aspiration needle 111 and the liquid droplet on the wall of a tube, may remain until after a preset time point. According to the second electrical signal before the preset time point, it cannot be analyzed that the second preset condition is not met, for example, according to the second electrical signal before the preset time point, it is not enough to determine whether the signal characteristic of the second electrical signal is the same as the signal characteristic of the abnormal signal. However, in order to prevent the liquid aspiration needle 111 from being in contact with the bottom of the container, the liquid surface reaching signal is also sent at the preset time point, and it is still possible at this time that the liquid aspiration needle 111 is not yet in contact with the actual liquid surface. The third electrical signal is acquired and analyzed after the liquid surface reaching information is sent, and subsequent detection can be implemented to determine whether the liquid aspiration needle 111 is in contact with the actual liquid surface when the liquid surface reaching signal is sent.

In some embodiments, referring to FIG. 12, the signal acquisition and analysis assembly 130 is configured to acquire the electrical signal in at least one of the following time periods as the third electrical signal: the electrical signal from time point T3 when the liquid surface reaching information is sent to time point T4 when the liquid aspiration assembly 110 stops moving down; the electrical signal from time point T4 when the liquid aspiration assembly 110 stops moving down to time point T5 when the liquid aspiration assembly 110 begins to aspirate the liquid; the electrical signal from time point T5 when the liquid aspiration assembly 110 begins to aspirate the liquid to time point T6 when the liquid aspiration assembly 110 completes liquid aspiration; and the electrical signal from time point T6 when the liquid aspiration assembly 110 completes the liquid aspiration to time point T7 when the liquid aspiration assembly 110 moves up.

For example, as shown in FIG. 12, the electrical signal, from time point T3 when the liquid surface reaching information is sent to time point T7 when the liquid aspiration assembly 110 moves up, is acquired as the third electrical signal, and the electrical signal before the needle is lifted at time point T7 can be fully used. Of course, the disclosure is also not limited thereto. For example, according to the performance of a sampling analysis assembly and an abnormal scenario needing to be identified, it is possible to determine which time period for acquiring and analyzing the third electrical signal, so as to adapt to accurate implementation of subsequent detection in different abnormal scenarios.

In some embodiments, the signal acquisition and analysis assembly 130 is further configured to determine, according to at least the third electrical signal, whether the third electrical signal meets a third preset condition, and to output a warning which indicates that the aspirating is abnormal if the third electrical signal meets the third preset condition.

Illustratively, the signal acquisition and analysis assembly 130 includes a warning device capable of outputting warning information, such as a display, and an indicator light. Alternatively, the control module 140 may include the warning device, and the signal acquisition and analysis assembly 130 may output the warning information by means of the warning device of the control module 140. Of course, the disclosure is also not limited thereto.

Illustratively, if the third electrical signal meets the third preset condition, it can be determined that the electrical signal meeting the first preset condition and the second preset condition is also an abnormal interference signal, and that the liquid aspiration needle 111 is actually not in contact with the liquid surface when the liquid surface reaching information is sent at the preset time point. In this case, the descending height of the liquid aspiration needle 111 is lower than a height required to descend, resulting in less or even empty aspiration, and a detection result of the sample analyzer 100 is not accurate enough, and a supplementary test can be warned.

In some embodiments, as shown in FIG. 12, if after the liquid surface reaching information is sent at the preset time point, it is determined that the third electrical signal meets the third preset condition, it is possible not to interfere with the action of the liquid aspiration needle 111, but the warning information is sent to warn a user, for example, the warning information is output when the liquid aspiration needle 111 moves up at time point T7. It should be noted that since the liquid aspiration needle 111 has begun to slow down at time point T3, if it is found at this time that the detected "liquid surface" is a false liquid surface, it is not easy to speed up the needle and to ignore the previously detected signal, which not only delays the time sequence of the system, but also challenges the rate of the electric motor 123, mechanical accuracy, etc. Therefore, until after the liquid aspiration needle 111 begins to slow down at time point T3, it is found that the detected electrical signal is an abnormal signal, a series of actions of the liquid aspiration needle 111 are allowed, and the warning information is then reported to warn the user of this test abnormality and request for a supplementary test, so as to avoid the deviation of a clinical result. A person skilled in the art would have been able to understand that in some cases where the requirements are not high, it is also possible to change the control action of this sample aspiration when it is identified that the third electrical signal is abnormal.

In some embodiments, the signal acquisition and analysis assembly 130 is configured to determine whether the third electrical signal meets the third preset condition, according to the first electrical signal and/or the second electrical signal, and the third electrical signal. By combining the first electrical signal and/or the second electrical signal and the third electrical signal, it can be accurately determined whether the third electrical signal meets the third preset condition so as to identify whether an abnormal interference signal is present. A person skilled in the art would have been able to understand that the third preset condition can be adjusted by means of a combination of signals, as long as the judgment characteristic applicable to the third electrical signal is included.

In some embodiments, the third preset condition includes one or more conditions, for example, includes at least one of the following: a third preset condition for identifying that a container has static electricity, a third preset condition for identifying that there is a liquid film adhering to an inner wall of the container, a third preset condition for identifying that there is a bubble above a liquid in the container, a third preset condition for identifying that the liquid aspiration assembly 110 is in contact with a liquid droplet, and a third preset condition for identifying that a liquid sample in the container is insufficient.

Illustratively, the signal acquisition and analysis assembly 130 is configured to output a warning if the third electrical signal meets the third preset condition, the warning including at least one of the following warning information: —a first warning information for indicating that the container has static electricity, which causes this liquid aspiration abnormality; —a second warning information for indicating that there is a liquid film adhering to an inner wall of the container, which causes this liquid aspiration abnormality; —a third warning information for indicating that there is a bubble above the liquid in the container, which causes this liquid aspiration abnormality; —a fourth warning information for indicating that the liquid aspiration assembly 110 is in contact with a liquid droplet on the inner wall of the container, which causes this liquid aspiration abnormality; and —a fifth warning information for indicating that a liquid sample in the container is insufficient, which causes this liquid aspiration abnormality. Thus, the user can quickly determine the cause of the liquid aspiration abnormality and solve it in time to improve the detection efficiency of the sample analyzer 100.

In some embodiments, the signal acquisition and analysis assembly 130 is configured to determine that the third electrical signal meets the third preset condition if a signal characteristic of the third electrical signal is the same as at least one preset second abnormal signal characteristic. For example, there may be one or more preset second abnormal signal characteristics, including but not limited to at least one of the following characteristics of: electrostatic signal, bubble abnormality, liquid droplet abnormality, small liquid amount abnormality and liquid film abnormality. Illustratively, when the signal characteristics of the second electrical signal and the third electrical signal are the same as the signal characteristic of the second abnormal signal, it is determined that the third electrical signal meets the third preset condition; when the signal characteristics of the first electrical signal and the third electrical signal are the same as the signal characteristic of the second abnormal signal, it is determined that the third electrical signal meets the third preset condition; or when the signal characteristics of the first electrical signal, the second electrical signal, and the third electrical signal are the same as the signal characteristic of the second abnormal signal, it is determined that the third electrical signal meets the third preset condition.

In some embodiments, the signal acquisition and analysis assembly 130 is configured to determine, when there is a change of regressing toward the signal baseline in the third electrical signal, that the signal characteristic of the third electrical signal is the same as the preset second abnormal signal characteristic, and/or to determine that the third electrical signal meets the third preset condition, and is also capable of outputting the warning which indicates that the aspirating is abnormal.

Illustratively, when the third electrical signal regresses to the preset range in the vicinity of the signal baseline, it is determined that the signal characteristic of the third electrical signal is the same as the preset second abnormal signal characteristic, and/or to determine that the third electrical signal meets the third preset condition, and is also capable of outputting the warning which indicates that the aspirating is abnormal.

Referring to FIG. 6, the second electrical signal of electrostatic signal B between time point T2 and time point T3 has not yet regressed to the preset range in the vicinity of the signal baseline, the liquid surface reaching signal can be sent at time point T3, and the third electrical signal can be acquired and analyzed after time point T3; and when it is detected that the third electrical signal regresses to the preset range in the vicinity of the signal baseline, it is determined that the third electrical signal meets the third preset condition. Referring to FIG. 7, the second electrical signal of electrostatic signal D between time point T2 and time point T3 has not yet regressed to the preset range in the vicinity of the signal baseline, the liquid surface reaching signal can be sent at time point T3, and the third electrical signal can be acquired and analyzed after time point T3; and when it is detected that the third electrical signal regresses to the preset range in the vicinity of the signal baseline, it is determined that the third electrical signal meets the third preset condition.

In some embodiments, the liquid aspiration needle 111 is in contact with the bubble at time point T1, causing the amplitude of the electrical signal to increase; it is detected from time point T1 to time point T2 that the first electrical signal meets the first preset condition; after time point T2, the bubble breaks itself, is pierced by the liquid aspiration needle 111, is broken by the liquid aspiration needle 111 or breaks when the liquid aspiration needle 111 is lifted, and there is a change of regressing toward the signal baseline in the second electrical signal or the third electrical signal after the bubble breaks; at time point T3, there is a certain probability that the electrical signal still does not regress to the preset range in the vicinity of the signal baseline, the liquid surface reaching signal can be sent at time point T3, and the third electrical signal can be acquired and analyzed after time point T3; and when the third electrical signal after time point T3 regresses to the preset range in the vicinity of the signal baseline, it can be determined that the third electrical signal meets the third preset condition.

In some embodiments, when it is analyzed that the second electrical signal regresses to the preset range in the vicinity of the signal baseline, it can be determined that there is a high probability of liquid aspiration abnormality caused by the static electricity; and when it is analyzed that the third electrical signal regresses to the preset range in the vicinity of the signal baseline, it can be determined that there is a high probability of liquid aspiration abnormality caused by bubble breakage. For example, the abnormal electrical signal caused by the static electricity has a short duration, and the abnormal electrical signal caused by bubble breakage has a long duration.

In some embodiments, the signal acquisition and analysis assembly 130 is configured to output the warning which indicates that the aspirating is abnormal, if the third electrical signal has a change rate between the slope in a fourth time period and the slope in a third time period that is greater than a preset threshold of change rate, where the fourth time period is later than the third time period.

In a liquid film scenario, if an abrupt increase in the slope of the third electrical signal is analyzed until after a preset time point, it can be determined that the electrical signal before the abrupt change is the interference signal of the liquid film, and when the liquid aspiration needle 111 is not in contact with the actual liquid surface at the preset time point but is in contact with the liquid surface during the abrupt change, it can be determined that the third electrical signal meets the third preset condition, and that this liquid aspiration is abnormal. Illustratively, if it is detected after the preset time point that a second abrupt change occurs in the third electrical signal, it can be determined that the electrical signal at the preset time point is the interference signal generated by the liquid film.

In some embodiments, the signal acquisition and analysis assembly 130 is further configured to output a warning which indicates that the aspirating is abnormal and/or the liquid in the container is insufficient, if the voltage amplitude of the third electrical signal from the completion of liquid aspiration of the liquid aspiration assembly 110 to the upward movement of the liquid aspiration assembly 110 is less than or equal to a preset second amplitude threshold. Illustratively, the warning information may also be configured to warn that this liquid aspiration abnormality is caused by a liquid droplet.

Figure 13:
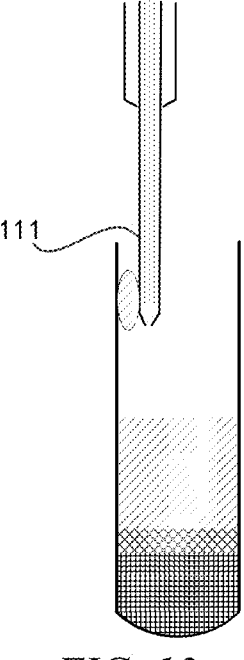
FIG. 13 is a schematic diagram of a liquid aspiration needle in contact with a liquid droplet in an embodiment.

Referring to FIG. 13, the tip of the liquid aspiration needle 111 being in contact with the liquid droplet on the inner wall of the container is also equivalent to the positive plate of a capacitor being enlarged. At this time, the capacitance will also change, which will also cause the change in electrical signal. However, since the volume and surface area of the liquid droplet are generally small, the voltage amplitude of the electrical signal is also small when the liquid aspiration needle 111 is in contact with the liquid droplet. When the voltage amplitude of the electrical signal is less than or equal to the second amplitude threshold, it can be determined that the liquid aspiration needle 111 is in contact with the liquid droplet, the liquid droplet is aspirated instead of the liquid contained in a lower part of the container, and the warning which indicates that the aspirating is abnormal can be output.

Figure 14:
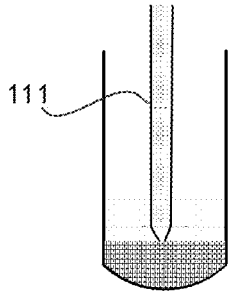
FIG. 14 is a schematic diagram of sample insufficiency in a container in an embodiment.

Referring to FIG. 14, the amount of liquid in the container is small, for example, less than a preset dead volume, where the dead volume, which may also be referred to as a lower limit of liquid volume, is the minimum liquid volume that can be normally detected by the sample analyzer 100. When the volume of the liquid in the container is below the dead volume, the sample analyzer 100 will be incapable of ensuring normal detection and sample aspiration. When the liquid aspiration needle 111 is in contact with a small volume of liquid, the voltage amplitude of the electrical signal also increases, but due to the small volume of liquid, the voltage amplitude is also small. When the voltage amplitude of the electrical signal is less than or equal to the second amplitude threshold, it can be determined that the amount of liquid in the container is insufficient, and the warning information for indicating that the amount of liquid in the container is insufficient can be output.

Illustratively, it is also possible to identify whether the liquid aspiration needle 111 is in contact with the liquid droplet or in contact with the small volume of liquid in the container according to the positional relationship between the liquid aspiration needle 111 and the liquid surface in the container, to determine that the liquid aspiration needle 111 is in contact with the liquid droplet when the tip of the liquid aspiration needle 111 is above the liquid surface, and to determine that the liquid aspiration needle 111 is in contact with the small volume of liquid when the tip of the liquid aspiration needle 111 is above the liquid surface. For example, an image of the container and the liquid aspiration needle 111 can be acquired, and the positional relationship between the liquid aspiration needle 111 and the liquid surface in the container can be determined according to the image. Of course, the disclosure is also not limited thereto.

In some embodiments, the rate at which the signal acquisition and analysis assembly 130 acquires the electrical signal is at least eight times higher than a rate of sudden change in capacitance at which the liquid aspiration assembly 110 contacts with the liquid surface. In other words, the sampling period of the signal acquisition and analysis assembly 130 is less than or equal to one eighth of the sudden change time of capacitance when the sampling assembly is in contact with the liquid surface. Illustratively, an acquisition rate of analog to digital conversion (ADC) in the signal acquisition and analysis assembly 130 is at least ten times higher than the sudden change rate of a capacitance signal. The first electrical signal, the second electrical signal and the third electrical signal can be acquired and analyzed quickly and accurately to obtain corresponding analysis results. Illustratively, it is possible to quickly determine whether the second electrical signal meets the second preset condition, and to acquire and analyze the first electrical signal again in time when the second electrical signal does not meet the second preset condition. Thus, at least one or more determinations on whether the second electrical signal meets the second preset condition can be performed before the preset time point, so as to prevent the misjudgment caused by a plurality of continuously abnormal interfering electrical signals. Moreover, the signal acquisition and analysis assembly 130 has a high acquisition rate and can fully identify signal changes to well identify the presence or absence of abnormal characteristics.

In some embodiments, as shown in FIG. 2, the liquid path 112 is provided with a pressure sensor 15, and the sample analyzer 100 further includes a pressure measurement assembly 152, where the pressure measurement assembly 152 is configured to determine a pressure value of the liquid path 112 according to a signal output by the pressure sensor 15. Illustratively, when empty aspiration, empty discharge or blockage occurs in the liquid aspiration needle 111, the pressure value of the liquid path 112 is different from a pressure value during normal liquid aspiration or liquid discharge of the liquid aspiration needle 111. The control module 140 may perform corresponding control according to the pressure value of the liquid path 112, such as outputting warning information and/or controlling the driving assembly 120 to move the liquid aspiration assembly 110.

In some embodiments, referring to FIGS. 3 to 5, the sample analyzer 100 performs three steps of liquid surface detection during liquid aspiration; in the first step, the acquisition of the second electrical signal is first triggered based on the first preset condition; and in the second step, the signal characteristic of the second electrical signal is then detected in real time, when the second preset condition is met, it is determined that the liquid aspiration needle 111 is in contact with the liquid surface, the liquid surface reaching signal is reported, and when the second preset condition is not met, the liquid surface reaching signal is not sent, and the first electrical signal may be acquired and analyzed again to determine whether the first preset condition is met. In the third step, the signal characteristic of the third electrical signal is also always detected after the liquid aspiration needle 111 slows down, if it is determined that the third electrical signal meets the third preset condition, the first electrical signal and/or the second electrical signal is determined to be an abnormal interference signal, and a warning information alarm is then sent at time point T7, namely, after needle lifting, to report this test abnormality and to request for a supplementary test. For example, in the whole process of liquid aspiration performed by the liquid aspiration needle 111, the signal characteristics of the electrical signals are detected and identified to eliminate the false and to retain the true, so that the reliability of liquid surface detection is ensured, and the abnormalities and alarms of liquid surface detection can also be found in time.

Illustratively, the first step may be referred to as a threshold detection step, in which the step change generated by a signal edge after the needle is in contact with the liquid surface is detected in the manner of comparing the electrical signal with a preset threshold, and a threshold detection method is implemented, for example, by comparing the relative amplitude change, slope or absolute amplitude, etc. of the electrical signal in a certain time period with corresponding preset thresholds, where the slope and magnitude of the signal change edge are related to factors such as the ion concentration and the volume of a liquid to be detected, and the response time and bandwidth of the circuit, and the corresponding preset thresholds are determined by selecting boundary signals.

Illustratively, the second step may be referred to as a real-time detection step; the first electrical signal in the threshold detection step may be a signal edge caused by interference; before the liquid aspiration needle 111 slows down at time point T3, it is possible to continue to detect the trend of the second electrical signal; if an abnormal signal caused by interference factors such as static electricity and bubble breakage is detected, the amplitude of the second electrical signal may fall back within the time of the second step, and is different from the characteristic of continuously remaining after the amplitude of the actual liquid surface signal rises; and when such a characteristic difference of the electrical signal is detected, the "liquid surface" signal detected based on the threshold is not reported, and the liquid aspiration needle 111 continues to move down for probing the true liquid surface and acquiring and analyzing the first electrical signal again until the user cannot discern the abnormal scenarios.

Illustratively, the third step may be referred to as a subsequent detection step, and the signals generated by some abnormal scenarios remain at a high level for a long duration, for example, the signal characteristics of the abnormal scenarios, such as a wide pulse generated by static electricity, bubble breakage, aspiration failure caused by sample insufficiency, and a needle being in contact with a liquid droplet on the wall of a tube, may remain until a preset time point, such as a time point after time point T3; and the liquid aspiration needle 111 has begun to slow down at time point T3, if it is found at this time that the detected "liquid surface" is a false liquid surface, it is not easy to speed up the needle and to ignore the previously detected electrical signal, which not only delays the time sequence of the system, but also challenges the rate of the electric motor, mechanical accuracy, etc. Therefore, until after the liquid aspiration needle 111 begins to slow down, it is found that the detected electrical signal is an abnormal signal, a series of actions of the liquid aspiration needle 111 are allowed, and this test abnormality is then reported to request for a supplementary test, so as to avoid the deviation of a clinical result.

In some embodiments, the threshold detection step and the real-time detection step may be combined to change the three steps into two steps, and the accuracy of liquid surface detection may also be improved by prolonging the time of threshold detection and adjusting the setting rule of thresholds. Illustratively, when the liquid aspiration assembly 110 is moving down toward the container, the electrical signal before the preset time point is acquired, and it is determined whether the electrical signal before the preset time point meets the first preset condition and the second preset condition different from the first preset condition; and when the electrical signal before the preset time point meets the first preset condition and the second preset condition, liquid surface reaching information is sent, and the preset time point is no later than the latest time point of reporting the liquid surface reaching information.

According to the sample analyzer provided in the embodiments of the disclosure, when the liquid aspiration assembly moves down in the container, the electrical signal for indicating the capacitance change of the liquid aspiration assembly is acquired; it is determined whether the electrical signal meets the first preset condition and the second preset condition different from the first preset condition; and the liquid surface reaching information is sent when the electrical signal meets the first preset condition and the second preset condition. The accuracy of liquid surface detection of the liquid in the container is improved by sending the liquid surface reaching information only when the electrical signal acquired by the signal acquisition and analysis assembly meets the first preset condition and the second preset condition.

In some embodiments, the liquid surface is detected by means of a capacitive method. When an abrupt change step of the electrical signal is detected, the signal is compared with the threshold of the first preset condition. When the threshold is exceeded, the signal is not reported first, and the subsequent second electrical signal then continues to be detected and is compared with an abnormal model, namely, an abnormal signal characteristic; and if it is found that the second electrical signal is an abnormal electrical signal, the liquid surface reaching information is not reported, and if it is a normal signal, the liquid surface reaching information is reported (real-time detection). Preferably, the liquid surface reaching information is uploaded for the first time at the preset time point, such as the latest reporting time point T3. Further, after reporting, the signal continues to be detected and is compared with the abnormal model; and if it is found that the liquid surface is a false liquid surface, a liquid surface detection error is reported.

An embodiment of the disclosure provides a process for identifying true and false liquid surface signal characteristics throughout liquid aspiration, and the accuracy of liquid surface detection is improved by means of the process of threshold detection, real-time detection and subsequent judgment. By widening a time window of liquid surface detection to the whole process of the liquid aspiration needle from contact with the liquid surface to leaving the liquid surface, there is sufficient time for distinguishing the true and false signal characteristics, and the detection reliability is accordingly improved.

By analyzing and extracting the signal characteristics of the abnormal scenarios such as static electricity, liquid film, liquid droplet, bubble and sample insufficiency, the inventor of the disclosure found that the changes in signal edge triggered at the beginning of the signal characteristics are completely consistent with the signal characteristics of the true liquid surface signal, but the signal characteristics of the abnormal scenarios cannot be kept the same as the signal characteristics of the true liquid surface signal throughout the liquid aspiration, that is to say, although the signal characteristics of the true and false liquid surface signals are easily confused during judgment based on the first preset condition, the interference signals may be identified by continuously detecting and identifying the signal characteristics throughout the liquid aspiration, so that the liquid surface reaching signal may be accurately sent, thus improving the accuracy of liquid surface detection of the liquid in the container.

Referring to FIG. 15 in conjunction with the foregoing embodiments, FIG. 15 is a schematic flowchart of a liquid aspiration control method for a sample analyzer according to an embodiment of the disclosure. The control method may be applied to the sample analyzer or a control device of the sample analyzer, and is configured to determine whether the liquid aspiration needle is in contact with the liquid surface, etc. according to the capacitance change of the liquid aspiration needle.

As shown in FIG. 15, the liquid aspiration control method for a sample analyzer according to an embodiment of the disclosure includes steps S110 to S130.

In step S110, when the liquid aspiration assembly moves down in the container, an electrical signal for indicating the capacitance change of the liquid aspiration assembly is acquired by the signal acquisition assembly, the liquid aspiration assembly is configured to aspirate the liquid in the container and is electrically connected to the signal acquisition assembly, and the signal acquisition assembly is configured to convert the capacitance change of the liquid aspiration assembly into the electrical signal.

Illustratively, an electrical signal before a preset time point may be acquired, and the preset time point is no later than the latest time point of reporting the liquid surface reaching information.

In step S120, it is determined whether the electrical signal meets the first preset condition and the second preset condition different from the first preset condition.

Illustratively, when the first electrical signal meets a preset threshold, it is determined that the first electrical signal meets the first preset condition; where the preset threshold is selected from: an amplitude change threshold, a slope threshold, and a first amplitude threshold.

Illustratively, when the signal characteristic of the second electrical signal is the same as at least one preset first abnormal signal characteristic, it is determined that the second electrical signal does not meet the second preset condition, and when the signal characteristic of the second electrical signal is different from the preset first abnormal signal characteristic, it is determined that the second electrical signal meets the second preset condition.

In step S130, when the electrical signal meets the first preset condition and the second preset condition, the liquid surface reaching information is sent.

In some embodiments, a signal acquisition assembly acquiring an electrical signal for indicating a capacitance change of the liquid aspiration assembly includes: acquiring a first electrical signal by the signal acquisition assembly; and acquiring a second electrical signal by the signal acquisition assembly, if the first electrical signal meets the first preset condition, where the second electrical signal is an electrical signal subsequent to the first electrical signal.

In some embodiments, determining whether the electrical signal meets a first preset condition and a second preset condition different from the first preset condition includes: determining whether the first electrical signal meets the first preset condition; and at least determining whether the second electrical signal meets the second preset condition.

In some embodiments, the liquid aspiration control method further includes: after the liquid surface reaching information is sent, further acquiring a third electrical signal by the signal acquisition assembly; at least determining whether the third electrical signal meets a third preset condition; and outputting a warning which indicates that the aspirating is abnormal if the electrical signal meets the third preset condition.

In some embodiments, at least determining whether the third electrical signal meets a third preset condition includes: when the signal characteristic of the third electrical signal is the same as the preset second abnormal signal characteristic, determining that the third electrical signal meets the third preset condition.

It will be appreciated that the specific principles and implementations of the liquid aspiration control method for a sample analyzer according to the embodiments of the disclosure are all similar to the sample analyzer in the previous embodiments, and will not be described in detail herein.

According to the liquid aspiration control method for a sample analyzer provided in the embodiments of the disclosure, when the liquid aspiration assembly moves down in the container, the electrical signal for indicating the capacitance change of the liquid aspiration assembly is acquired; it is determined whether the electrical signal meets the first preset condition and the second preset condition different from the first preset condition; and the liquid surface reaching information is sent when the electrical signal meets the first preset condition and the second preset condition. The accuracy of liquid surface detection of the liquid in the container is improved by sending the liquid surface reaching information only when the electrical signal acquired by the signal acquisition and analysis assembly meets the first preset condition and the second preset condition.

An embodiment of the disclosure further provides a computer-readable storage medium having a computer program stored thereon, the computer program allowing, when executed by a processor, the processor to implement the steps of the liquid aspiration control method for a sample analyzer described above.

The computer-readable storage medium may be an internal storage unit of the sample analyzer described in any one of the embodiments described above, such as a hard disk or a memory of the sample analyzer. The computer-readable storage medium may also be an external storage apparatus of the sample analyzer, such as a removable hard disk, a smart media card (SMC), a secure digital (SD) card, or a flash card equipped on the sample analyzer.

It should be understood that the terms used in the disclosure are only intended to describe specific embodiments, but not to limit the disclosure.

It should also be understood that the term "and/or" used in the disclosure and the appended claims refers to one of the items listed correlatively or any combination and all possible combinations of the items, and includes these combinations.

The above descriptions are merely the specific embodiments of the disclosure, but the scope of protection of the disclosure is not limited thereto, those skilled in the art would readily think of various equivalent modifications or substitutions within the technical scope disclosed in the disclosure, and these modifications or substitutions should all be intended to be included within the scope of protection of the disclosure. Therefore, the scope of protection of the disclosure shall be subject to the scope of protection of the claims.

What is claimed is:

1. A sample analyzer, comprising:
a liquid aspiration assembly for aspirating a liquid in a container;
a driving assembly for driving the liquid aspiration assembly to move; and
a signal acquisition and analysis assembly for acquiring an electrical signal based on a capacitance of the liquid aspiration assembly; wherein:
while the liquid aspiration assembly is driven by the driving assembly to move down toward the container;
the signal acquisition and analysis assembly acquires a first electrical signal and determines whether the first electrical signal meets a first preset condition, after an abrupt change occurs in the electrical signal;
in response to determining that the first electrical signal meets the first preset condition, the signal acquisition and analysis assembly acquires a second electrical signal and determines whether the second electrical signal meets a second preset condition different from the first preset condition;
in response to determining that the second electrical signal meets the second preset condition, the signal acquisition and analysis assembly sends liquid surface reaching information;
in response to determining that the second electrical signal does not meet the second preset condition, the signal acquisition and analysis assembly re-acquires a first electrical signal and determines whether the re-acquired first electrical signal meets the first preset condition; and
in response to determining that the re-acquired first electrical signal meets the first preset condition, the signal acquisition and analysis assembly sends the liquid surface reaching information.

2. The sample analyzer according to claim 1, wherein the signal acquisition and analysis assembly sends information indicating that the liquid aspiration assembly reaches a surface of the liquid at a preset time point in response to the re-acquired first electrical signal meeting the first preset condition, and the preset time point is no later than the latest time point of reporting the information indicating that the liquid aspiration assembly reaches a surface of the liquid.

3. The sample analyzer according to claim 1, wherein the signal acquisition and analysis assembly determines whether the first electrical signal and the second electrical signal do not meet the second preset condition.

4. The sample analyzer according to claim 1, wherein the signal acquisition and analysis assembly determines that the first electrical signal meets the first preset condition in response to the first electrical signal meeting a preset threshold.

5. The sample analyzer according to claim 1, wherein the signal acquisition and analysis assembly determines that the second electrical signal does not meet the second preset condition, in response to a signal characteristic of the second electrical signal being the same as at least one preset first abnormal signal characteristic, and determines that the second electrical signal meets the second preset condition, in response to the signal characteristic of the second electrical signal being different from the preset first abnormal signal characteristic.

6. The sample analyzer according to claim 1, wherein the signal acquisition and analysis assembly determines that the second electrical signal does not meet the second preset condition in response to the second electrical signal regressing to a preset range in a vicinity of a signal baseline.

7. The sample analyzer according to claim 1, wherein the signal acquisition and analysis assembly determines that the second electrical signal does not meet the second preset condition in response to a slope of a change trend of the second electrical signal being less than or equal to a preset slope threshold, or less than or equal to a slope of a change trend of the first electrical signal.

8. The sample analyzer according to claim 1, wherein the signal acquisition and analysis assembly is configured to determine that the second electrical signal meets the second preset condition, in response to the second electrical signal or the first electrical signal and the second electrical signal having a change rate between a slope of a signal change in a second time period and a slope of a signal change in a first time period that is greater than a preset threshold of change rate, wherein the second time period is later than the first time period.

9. The sample analyzer according to claim 1, wherein the signal acquisition and analysis assembly sends information indicating that the liquid aspiration assembly reaches a surface of the liquid at a preset time point that is no later than the latest time point of reporting the information indicating that the liquid aspiration assembly reaches a surface of the liquid.

10. The sample analyzer according to claim 1, wherein the signal acquisition and analysis assembly further acquires and analyze a third electrical signal after sending the liquid surface reaching information.

11. The sample analyzer according to claim 10, wherein the signal acquisition and analysis assembly acquires the electrical signal as the third electrical signal from at least one of the following time periods:
from sending information indicating that the liquid aspiration assembly reaches a surface of the liquid to the liquid aspiration assembly stopping moving down;
from the liquid aspiration assembly stopping moving down to the liquid aspiration assembly beginning to aspirate the liquid;
from the liquid aspiration assembly beginning to aspirate the liquid to the liquid aspiration assembly completing liquid aspiration; and
from the liquid aspiration assembly completing the liquid aspiration to the liquid aspiration assembly moving up.

12. The sample analyzer according to claim 10, wherein the signal acquisition and analysis assembly further determines, according to at least the third electrical signal, whether the third electrical signal meets a third preset condition, and outputs information for indicating abnormal liquid aspiration, in response to the third electrical signal meeting the third preset condition.

13. The sample analyzer according to claim 12, wherein the signal acquisition and analysis assembly determines whether the third electrical signal meets the third preset condition, according to the first electrical signal and/or the second electrical signal, and the third electrical signal.

14. The sample analyzer according to claim 12, wherein the third preset condition comprises one or more conditions, and the signal acquisition and analysis assembly outputs a warning in response to the third electrical signal meeting the third preset condition, the warning comprising at least one of following warning information:

first warning information for indicating that the container has static electricity, which causes the liquid aspiration abnormality;

second warning information for indicating that there is a liquid film adhering to an inner wall of the container, which causes the liquid aspiration abnormality;

third warning information for indicating that there is a bubble above the liquid in the container, which causes the liquid aspiration abnormality;

fourth warning information for indicating that the liquid aspiration assembly is in contact with a liquid droplet on an inner wall of the container, which causes the liquid aspiration abnormality; and fifth warning information for indicating that the liquid in the container is insufficient, which causes the liquid aspiration abnormality.

15. The sample analyzer according to claim 12, wherein the signal acquisition and analysis assembly determines that the third electrical signal meets the third preset condition, in response to a signal characteristic of the third electrical signal being the same as a preset second abnormal signal characteristic.

16. The sample analyzer according to claim 10, wherein the signal acquisition and analysis assembly outputs a warning which indicates that the aspiration is abnormal, in response to the third electrical signal regressing to a preset range in a vicinity of a signal baseline.

17. The sample analyzer according to claim 10, wherein the signal acquisition and analysis assembly outputs a warning which indicates that the aspiration is abnormal, in response to the third electrical signal having a change rate between a slope in a fourth time period and a slope in a third time period that is greater than a preset threshold of change rate, wherein the fourth time period is later than the third time period.

18. The sample analyzer according to claim 10, wherein the signal acquisition and analysis assembly further outputs a warning which indicates that the aspiration is abnormal and/or the liquid in the container is insufficient, in response to a voltage amplitude of the third electrical signal from the completion of liquid aspiration of the liquid aspiration assembly to the upward movement of the liquid aspiration assembly being less than or equal to a preset amplitude threshold.

19. The sample analyzer according to claim 1, wherein a rate at which the signal acquisition and analysis assembly acquires the electrical signal is at least eight times higher than a rate of sudden change in capacitance in response to the liquid aspiration assembly contacting with the liquid surface.

20. The sample analyzer according to claim 1, wherein the sample analysis analyzer further comprises a control module that controls the movement of the driving assembly, so as to keep the liquid aspiration assembly from moving down, based on the information indicating that the liquid aspiration assembly reaches a surface of the liquid sent by the signal acquisition and analysis assembly.

21. A liquid aspiration control method for a sample analyzer, comprising:

during a liquid aspiration assembly moving down in a container, acquiring, by a signal acquisition assembly of the sample analyzer, a first electrical signal for indicating a capacitance change of the liquid aspiration assembly, determining whether the first electrical signal meets a first preset condition;

acquiring, by the signal acquisition assembly, a second electrical signal for indicating the capacitance change of the liquid aspiration assembly, in response to the first electrical signal meeting the first preset condition, wherein the signal acquisition assembly is configured to convert the capacitance change of the liquid aspiration assembly into an electrical signal, wherein the liquid aspiration assembly for aspirating a liquid in the container is electrically connected to the signal acquisition assembly;

determining whether the second electrical signal meets a second preset condition different from the first preset condition; and sending liquid surface reaching information in response to determining that the second electrical signal meets the second preset condition; and in response to determining that the second electrical signal does not meet the second preset condition, re-acquiring, by the signal acquisition assembly, a first electrical signal and determining whether the re-acquired first electrical signal meets the first preset condition; and in response to determining that the re-acquired first electrical signal meets the first preset condition, sending the liquid surface reaching information.

22. The liquid aspiration control method according to claim 21, wherein the liquid aspiration control method further comprises:

acquiring a third electrical signal by the signal acquisition assembly after sending the liquid surface reaching information;

at least determining whether the third electrical signal meets a third preset condition; and outputting a warning which indicates that the aspirating is abnormal in response to the electrical signal meeting the third preset condition.

23. The liquid aspiration control method according to claim 22, wherein at least determining whether the third electrical signal meets a third preset condition comprises:

determining that the third electrical signal meets the third preset condition in response to a signal characteristic of the third electrical signal being the same as a preset abnormal signal characteristic.

* * * * *